(12) United States Patent
Tagami

(10) Patent No.: US 12,051,452 B1
(45) Date of Patent: Jul. 30, 2024

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventor: Naoki Tagami, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/243,069

(22) Filed: Sep. 6, 2023

(30) Foreign Application Priority Data

Mar. 24, 2023 (JP) .................................. 2023-048363

(51) Int. Cl.
  G11B 5/596 (2006.01)
(52) U.S. Cl.
  CPC ...... G11B 5/59688 (2013.01); G11B 5/59655 (2013.01)
(58) Field of Classification Search
  None
  See application file for complete search history.

(56) References Cited

U.S. PATENT DOCUMENTS

| | | | |
|---|---|---|---|
| 6,965,489 B1 * | 11/2005 | Lee | G11B 5/59633 360/75 |
| 10,748,569 B1 | 8/2020 | Ogawa et al. | |
| 11,087,796 B2 | 8/2021 | Tagami | |
| 11,094,342 B2 | 8/2021 | Asakura et al. | |
| 11,100,947 B1 | 8/2021 | Tagami | |
| 2004/0252394 A1 * | 12/2004 | Hamaguchi | G11B 5/59655 360/48 |
| 2006/0014053 A1 * | 1/2006 | Asakura | G11B 5/865 428/848.6 |
| 2007/0223127 A1 * | 9/2007 | Maruyama | G11B 20/10009 360/48 |
| 2009/0268322 A1 * | 10/2009 | Annampedu | G11B 5/59622 360/29 |
| 2020/0286517 A1 * | 9/2020 | Tagami | G11B 20/10268 |
| 2022/0406331 A1 * | 12/2022 | Obara | G11B 20/1217 |

FOREIGN PATENT DOCUMENTS

| | | |
|---|---|---|
| JP | 2020-144965 A | 9/2020 |
| JP | 2020-155172 A | 9/2020 |
| JP | 2021-018827 A | 2/2021 |

* cited by examiner

*Primary Examiner* — Peter Vincent Agustin
(74) *Attorney, Agent, or Firm* — Maier & Maier, PLLC

(57) ABSTRACT

According to an embodiment, a magnetic disk is provided with a servo sector in which a preamble and a burst pattern are recorded. A recording frequency of the preamble is different from an even multiple of a recording frequency of the burst pattern. A controller determines a demodulation period of the burst pattern while a magnetic head passes through the servo sector. The controller acquires a first phase of a demodulation signal of the burst pattern and acquires first position information of the magnetic head, by demodulating the burst pattern in the demodulation period. The controller corrects the first position information on the basis of the first phase. The controller executes positioning control of the magnetic head on the basis of second position information that is post-correction first position information.

20 Claims, 14 Drawing Sheets

MAGNETIC DISK DEVICE AND METHOD

CROSS-REFERENCE TO RELATED APPLICATIONS

This application is based upon and claims the benefit of priority from Japanese Patent Application No. 2023-048363, filed on Mar. 24, 2023, the entire contents of which are incorporated herein by reference.

FIELD

Embodiments described herein relate generally to a magnetic disk device and a method.

BACKGROUND

On a magnetic disk included in a magnetic disk device, servo sectors are arranged at intervals in a circumferential direction. In each of the servo sectors, servo data including a servo mark and a burst pattern is recorded. The servo mark is data used as a reference for determining timing of demodulating the servo data. The burst pattern is data for detecting an offset amount of a position of a magnetic head from a track center.

In recent years, a magnetic disk device has been considered. The magnetic disk device has a short servo sector whose amount of data to be demodulated is smaller than that of a normal servo sector (hereinafter, referred to as a normal servo sector). Such a magnetic disk device demodulates the burst pattern without demodulating the servo mark in the short servo sector.

DETAILED DESCRIPTION

According to the present embodiment, a magnetic disk device includes a magnetic disk, a magnetic head, and a controller. On the magnetic disk, at least two or more first servo sectors, each recording servo data, are arranged at intervals in a circumference direction. The servo data includes a preamble and a burst pattern. A recording frequency of the preamble is 1/K (K is a positive integer) of a first frequency. A recording frequency of the burst pattern is 1/L (L is a positive integer) of the first frequency. The recording frequency of the preamble is different from an even multiple of the recording frequency of the burst pattern. The magnetic head executes writing/reading of data on the magnetic disk in a write/read direction along the circumferential direction. The controller determines a demodulation period of the burst pattern while the magnetic head passes through one of the at least two or more first servo sectors, and performs sampling on the burst pattern at the first frequency in the demodulation period. The controller demodulates a burst waveform obtained by the sampling and acquires a first phase of the burst waveform and first position information of the magnetic head. The controller corrects the first position information on the basis of the first phase, and executes positioning control of the magnetic head on the basis of second position information being post-correction first position information.

In the following, a magnetic disk device and a method according to each of the embodiments will be described in detail with reference to the accompanying drawings. Note that the present invention is not limited to these embodiments.

First Embodiment

Figure 1:
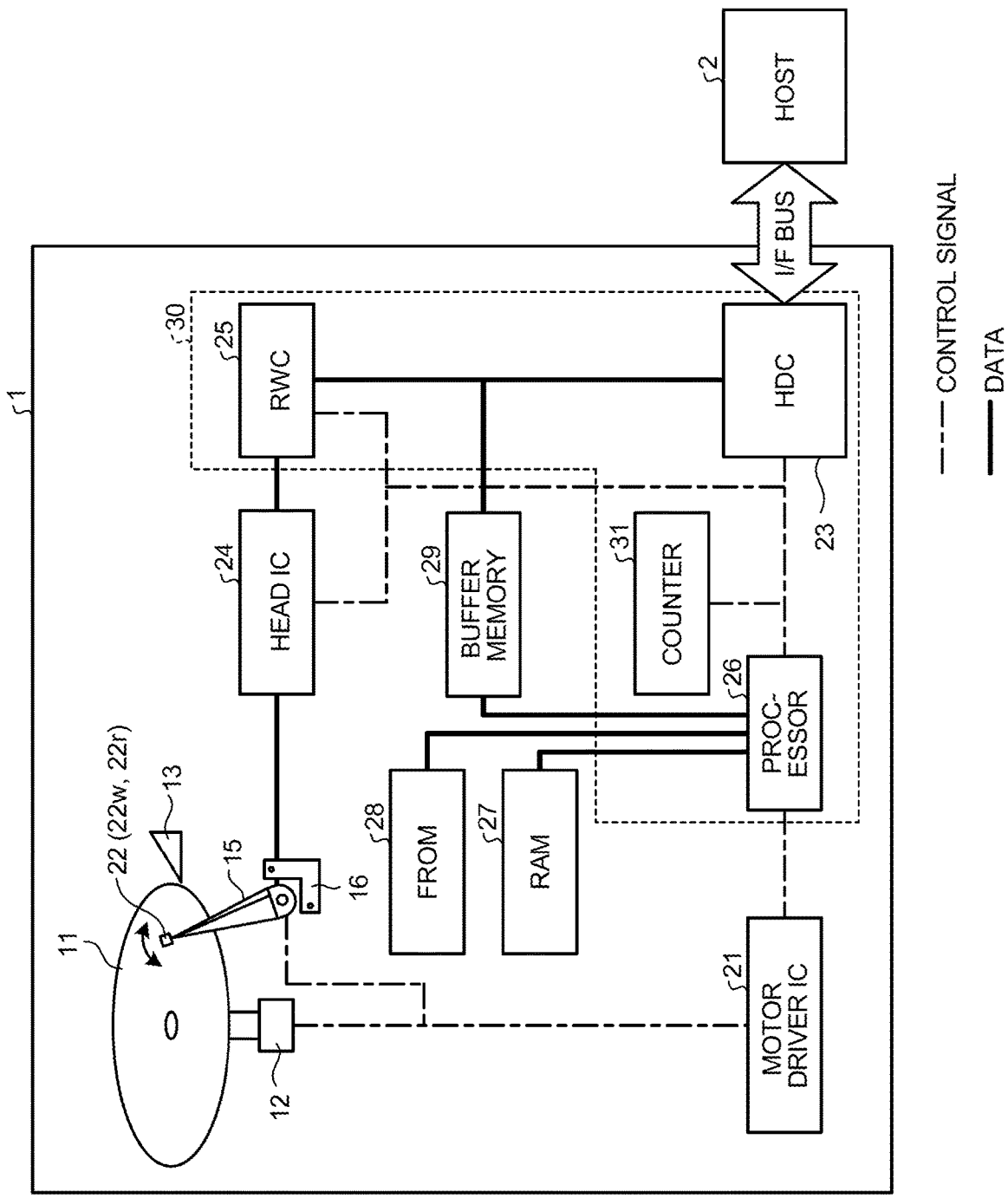
FIG. 1 is a schematic diagram illustrating an example of a configuration of a magnetic disk device of a first embodiment.

FIG. 1 is a schematic diagram illustrating an example of a configuration of a magnetic disk device 1 of a first embodiment.

The magnetic disk device 1 is connected to a host 2. The magnetic disk device 1 can receive a write command, a read command, and so forth from the host 2.

The magnetic disk device 1 includes a magnetic disk 11 whose surface is provided with a magnetic layer. The magnetic disk device 1 writes data to the magnetic disk 11 and reads data from the magnetic disk 11 in response to an access command.

Data is written and read via a magnetic head 22. Specifically, the magnetic disk device 1 includes, in addition to the magnetic disk 11, a spindle motor 12, a ramp 13, an actuator arm 15, a voice coil motor (VCM) 16, a motor driver integrated circuit (IC) 21, the magnetic head 22, a hard disk controller (HDC) 23, a head IC 24, a read/write channel (RWC) 25, a processor 26, a RAM 27, a flash read only memory (FROM) 28, a buffer memory 29, and a counter 31.

The magnetic disk 11 is rotated at a predetermined rotation speed by the spindle motor 12 attached coaxially. The spindle motor 12 is driven by the motor driver IC 21.

The processor 26 controls rotation of the spindle motor 12 and rotation of the VCM 16 via the motor driver IC 21.

The magnetic head 22 performs writing of data and reading of data on the magnetic disk 11 by a write head 22w and a read head 22r provided in the magnetic head 22. The magnetic head 22 is attached to a distal end of the actuator arm 15. The magnetic head 22 is moved in a radial direction of the magnetic disk 11 by the VCM 16 driven by the motor driver IC 21. Note that one or both of the write heads 22w and the read heads 22r of the magnetic head 22 may be provided for a single magnetic head 22.

When the rotation of the magnetic disk 11 is stopped, the magnetic head 22 is moved onto the ramp 13. The ramp 13 is configured to hold the magnetic head 22 at a position spaced apart from the magnetic disk 11.

In the read operation, the head IC 24 amplifies and outputs a signal read from the magnetic disk 11 by the magnetic head 22, and supplies the signal to the RWC 25. In addition, in the write operation, the head IC 24 amplifies a signal corresponding to data to be written, which is supplied from the RWC 25, and supplies the amplified signal to the magnetic head 22.

The HDC 23 performs control of transmission and reception of data to and from the host 2 via an I/F bus, control of the buffer memory 29, error correction processing of read data, and so forth.

The buffer memory 29 is used as a buffer for data transmitted to and received from the host 2. For example, the buffer memory 29 is used for temporarily storing the data to be written or the data read from the magnetic disk 11.

The buffer memory 29 includes, for example, a volatile memory capable of a high-speed operation. A type of the memory included in the buffer memory 29 is not limited to a specific type. The buffer memory 29 may be configured by, for example, a dynamic random access memory (DRAM), a static random access memory (SRAM), or a combination thereof. Note that the buffer memory 29 may include an optional non-volatile memory.

The RWC 25 modulates data to be written supplied from the HDC 23, and supplies the modulated data to the head IC 24. In addition, the RWC 25 demodulates the signal read from the magnetic disk 11 and supplied from the head IC 24, and outputs the demodulated signal to the HDC 23 as digital data.

The processor 26 is, for example, a central processing unit (CPU). The RAM 27, the flash read only memory (FROM) 28, the buffer memory 29, and the counter 31 are connected to the processor 26.

The FROM 28 is a type of a non-volatile memory. The FROM 28 stores firmware (program data), various operation parameters, etc. Note that the firmware may be stored in the magnetic disk 11.

For example, the RAM 27 includes a DRAM, an SRAM, or a combination thereof. The RAM 27 is used as an operation memory by the processor 26. The RAM 27 is used as an area in which firmware is loaded and an area in which various types of management data are temporarily stored.

The processor 26 performs overall control of the magnetic disk device 1 according to the firmware stored in the FROM 28 or the magnetic disk 11. For example, the processor 26 loads the firmware from the FROM 28 or the magnetic disk 11 to the RAM 27, and executes control of the motor driver IC 21, the head IC 24, the RWC 25, the HDC 23, and so forth according to the loaded firmware.

The counter 31 is a timer circuit that increments a count value with time. The processor 26 uses the counter 31 to determine timing of various kinds of operations. A type of the counter 31 is not limited to a specific type. In one example, the counter 31 may be a voltage-controlled oscillator (VCO) counter.

Note that a configuration including the HDC 23, the RWC 25, the processor 26, and the counter 31 can also be regarded as a controller 30. In addition to these elements, the controller 30 may include other elements (such as the RAM 27, the FROM 28, the buffer memory 29, etc.). The counter 31 may be provided outside the controller 30.

Moreover, a firmware program may be stored in the magnetic disk 11. A part or all of functions of the processor 26 may be realized by a hardware circuit such as a field-programmable gate array (FPGA) or an application specific integrated circuit (ASIC).

Figure 2:
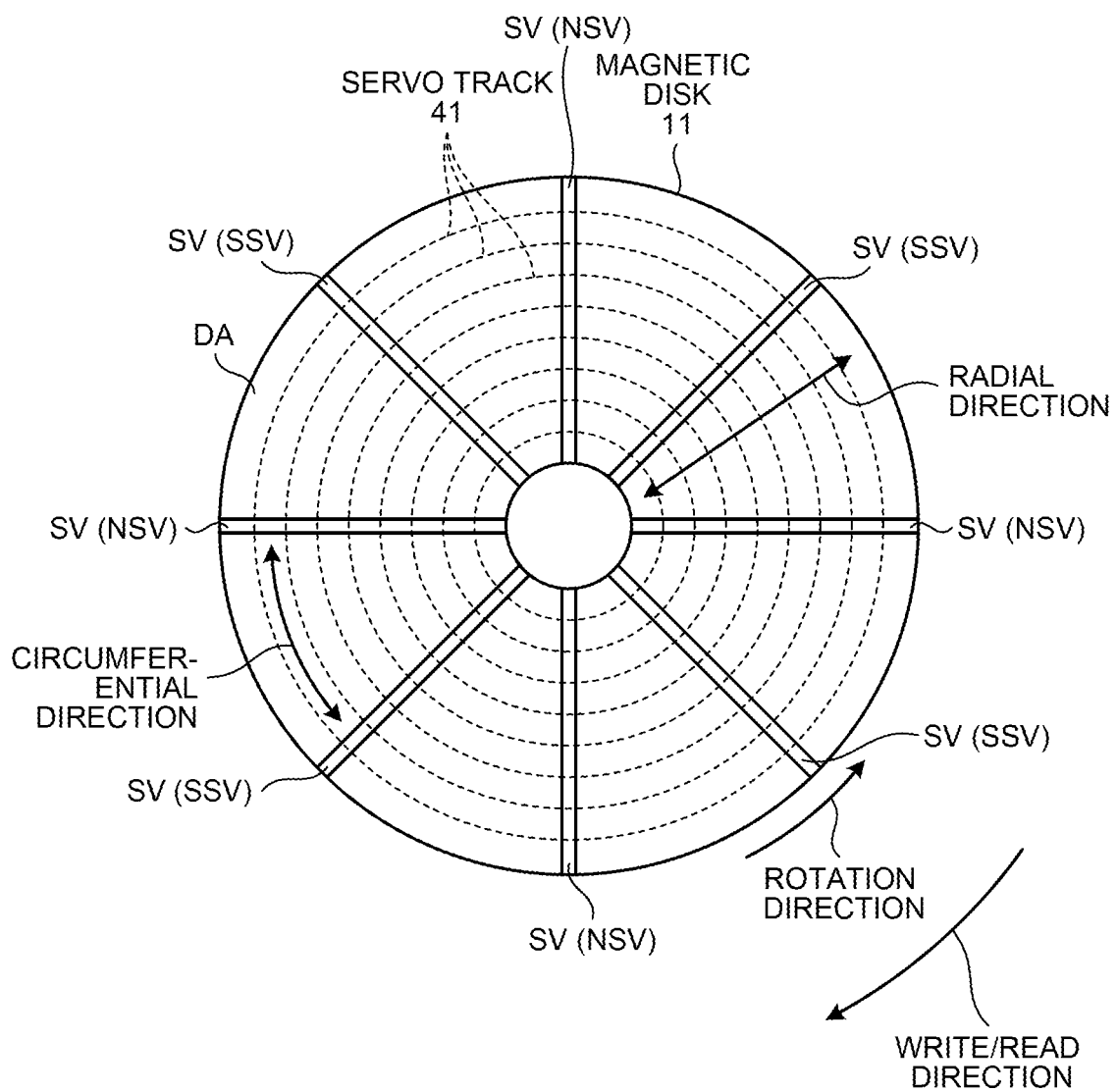
FIG. 2 is a schematic diagram illustrating an example of the configuration of a magnetic disk of the first embodiment.

FIG. 2 is a schematic diagram illustrating an example of a configuration of the magnetic disk 11 of the first embodiment. In FIG. 2, an example of a rotation direction of the magnetic disk 11 is illustrated. The magnetic head 22 moves relatively to the magnetic disk 11 in accordance with the rotation of the magnetic disk 11. Thus, the write/read direction, that is, a direction in which data is written or read by the magnetic head 22 in the circumferential direction is opposite to the rotation direction of the magnetic disk 11.

Servo data used for positioning of the magnetic head 22 is written to the magnetic disk 11 by, for example, a servo writer or self-servo writing (SSW) in a manufacturing process. According to FIG. 2, as an example of an arrangement of a servo area in which the servo data is written, a plurality of servo areas SV arranged radially in the radial direction and at predetermined intervals in the circumferential direction is illustrated. A space between two adjacent servo areas SV in the circumferential direction is used as a data area DA where data is written. The number of the servo areas SV is at least two or more.

The servo areas SV includes a plurality of normal servo areas NSV and a plurality of short servo areas SSV. According to the example illustrated in FIG. 2, the normal servo areas NSV and the short servo areas SSV are alternately arranged in the circumferential direction. That is, the at least one or more short servo areas SSV are arranged between the two normal servo areas NSV continuously arranged in the circumferential direction, in other words, between the two adjacent normal servo areas NSV.

Concentric servo tracks 41 are provided in the radial direction of the magnetic disk 11. The servo data written in the servo areas SV is used for positioning control of the magnetic head 22.

More specifically, concentric data tracks are provided on an area of the magnetic disk 11 where the servo tracks 41 are provided. The servo tracks 41 may be used as the data tracks. The data tracks different from the servo tracks 41 may be provided. The data tracks continuous in the circumferential direction are provided in an area divided by the data area DA on each data track. Each data track allows data to be written. Note that the data written to each data track includes user data received from the host 2, metadata (such as an error correction code) accompanying the user data, system data, etc. The magnetic disk device 1 holds in advance setting of a positional relationship between the servo tracks 41 and the data tracks. The magnetic disk device 1 performs positioning control to position the magnetic head 22 on a target data track on the basis of the servo data recorded in the servo areas SV. The positioning control includes a seek operation, which is an operation of moving the magnetic head 22 in the radial direction toward the target data track, a tracking operation of maintaining the magnetic head 22 on the target data track, etc.

Hereinafter, an area divided by the normal servo areas NSV on the servo tracks 41 is referred to as a normal servo sector NSV. An area divided by the short servo areas SSV on the servo tracks 41 is referred to as a short servo sector SSV. In addition, the normal servo sector NSV and the short servo sector SSV are collectively referred to as a servo sector SV.

In addition, in a case where first data and second data are written in the write/read direction and the first data is written in an area read earlier than the second data, a direction toward the area of the first data from an area where the second data is written may be referred to as "front" or "before" or "preceding" of the area where the second data is written. Conversely, a direction toward the area of the second data from the area where the first data is written may be referred to as "rear" or "after" or "subsequent" of the area where the first data is written. In a case where the first area is focused on and an "immediately preceding second area" or a "second area arranged immediately in front" are described, the "immediately preceding second area" and the "second area arranged immediately in front" represent the second area through which the magnetic head 22 passes last before the magnetic head 22 passes through the first area. In a case where the first area is focused on and a "immediately subsequent second area" or a "second area arranged immediately subsequent" are described, the "immediately subsequent second area" and the "second area arranged immediately subsequent" represent the second area through which the magnetic head 22 passes first after the magnetic head 22 passes through the first area.

In addition, in the circumferential direction, an edge on a front side of an area may be referred to as a "start" of the area. In addition, in the circumferential direction, an edge on a rear side of an area may be referred to as an "end" of the area.

Figure 3:
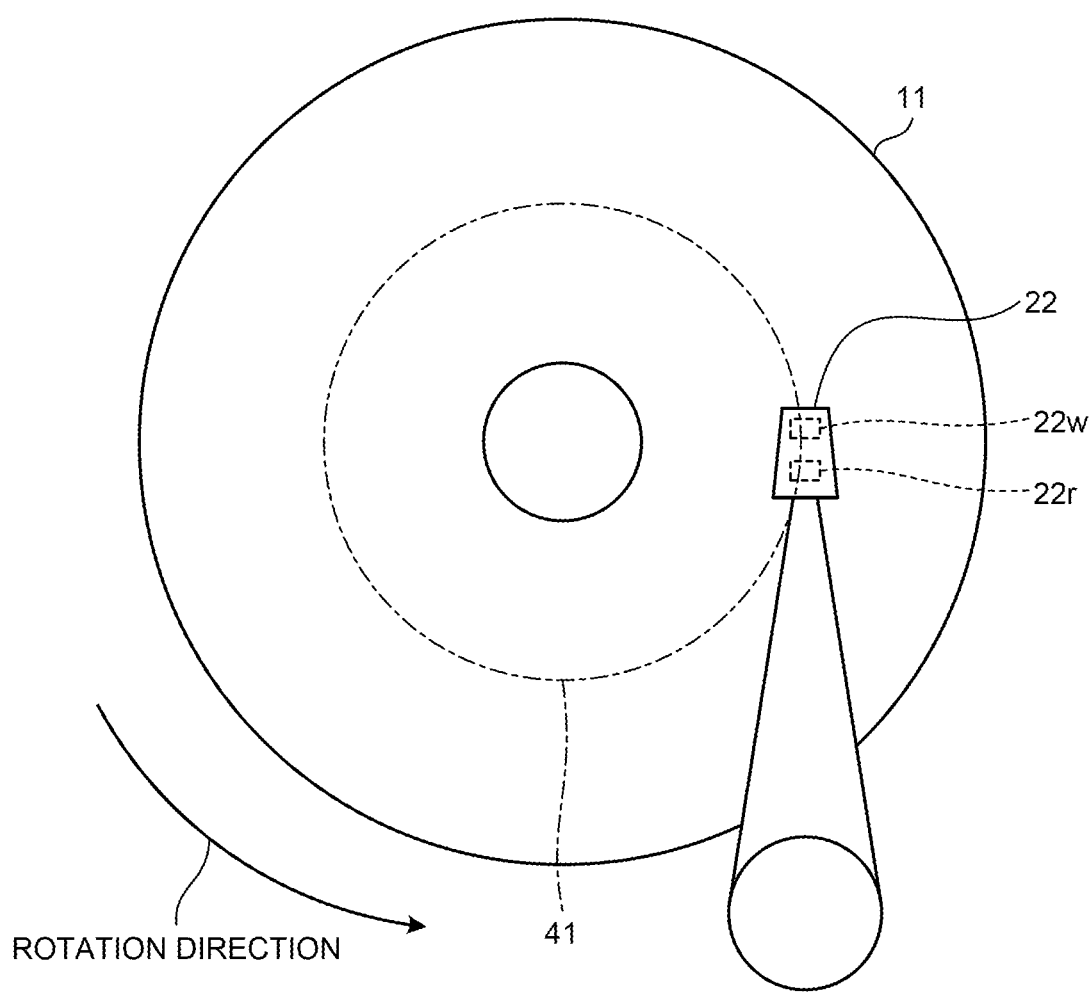
FIG. 3 is a view for describing an example of a positional relationship between a read head and a write head of the first embodiment.

FIG. 3 is a view for describing an example of a positional relationship between the read head 22r and the write head 22w of the first embodiment. According to the example illustrated in FIG. 3, the read head 22r and the write head 22w are arrayed in a direction in which the actuator arm 15 extends. The read head 22r is arranged closer to a rotation axis of the actuator arm 15 than the write head 22w. Then, in a state where the magnetic head 22 is positioned on some data track, the write head 22w moves relatively to the magnetic disk 11 behind the read head 22r.

That is, in the circumferential direction of the magnetic disk 11, a gap exists between the read head 22r and the write head 22w, and the write head 22w moves relatively to the magnetic disk 11 so as to be delayed from the read head 22r by the gap. A length of the gap in the circumferential direction between the read head 22r and the write head 22w is referred to as a read/write gap length.

Note that the read/write gap length varies with a skew angle of the magnetic head 22. Then, the skew angle of the magnetic head 22 varies with a radial position of the magnetic head 22. That is, the read/write gap length varies with the radial position.

In the write operation of writing data to the data area DA, reading of the servo data from the servo area SV by the read head 22r and writing of data to the data area DA by the write head 22w are executed exclusively in time. However, the write head 22w moves in the circumferential direction of the magnetic disk 11 behind the read head 22r for the read/write gap length. Thus, an area where data cannot be written may be generated immediately in front of the servo sector SV in the circumferential direction. Such an area where the data cannot be written is referred to as an unwritable area in the present specification.

In order to minimize the total capacity of the unwritable area in the magnetic disk 11, the controller 30 does not read the servo data recorded in a front part of the short servo sector SSV in the write operation.

That is, the short servo sector SSV and the normal servo sector NSV are configured in such a manner that, in the write operation, a length of a section in the short servo sector SSV where reading of the servo data is executed is shorter than a length of a section in the normal servo sector NSV where reading of the servo data is executed. Then, in the write operation, the short servo sector SSV and the normal servo sector NSV are configured in such a manner that the front part of the short servo sector SSV is not read.

Even when the read head 22r reaches the short servo sector SSV in the write operation, the controller 30 can write data until the read head 22r reaches a rear part of the short servo sector SSV. Therefore, it is possible to suppress the length of the unwritable area existing immediately in front of the short servo sector SSV. As a result, the total capacity of the unwritable area in the magnetic disk 11 can be suppressed.

Note that the servo data recorded in the front part of the short servo sector SSV may be read in the seek operation or the read operation. The read operation is an operation of reading data from the data area DA.

Figure 4:
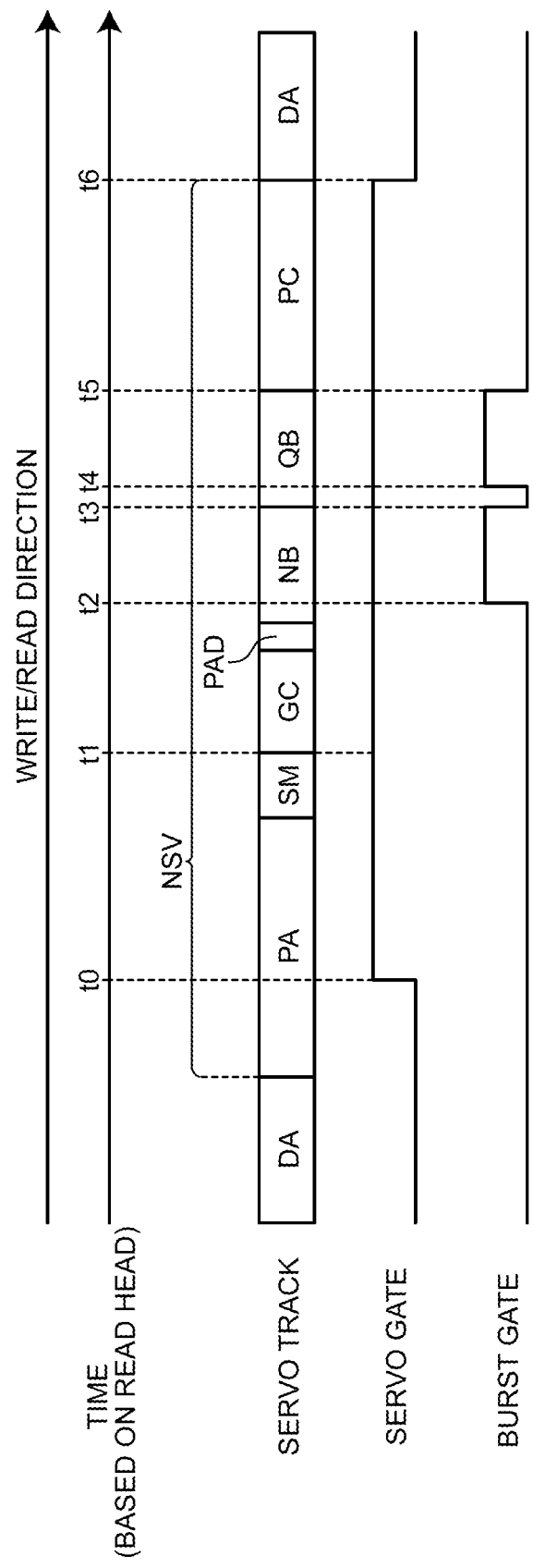
FIG. 4 is a view illustrating an example of a configuration of a normal servo sector of the first embodiment.

FIG. 4 is a view illustrating an example of a configuration of the normal servo sector NSV of the first embodiment. In FIG. 4, a configuration of the normal servo sector NSV and a time axis indicating a time at which the read head 22r is located on the normal servo sector NSV.

In the normal servo sector NSV, a preamble area PA where a preamble is recorded, a servo mark area SM where a servo mark is recorded, a gray code area GC where a gray code is recorded, a pad area PAD where a PAD is recorded, a burst area NB where an N burst is recorded, a burst area QB where a Q burst is recorded, and a post code area PC where a post code is recorded, are arranged in this order in the write/read direction.

The preamble is pattern data of a single period that periodically changes in the circumferential direction. The preamble is used for adjusting amplitude, a phase, and a frequency of sampling data when a servo waveform read by the read head 22r is taken into the RWC 25 as the sampling data on the basis of a servo clock.

Note that the servo clock is generated by the RWC 25. A frequency of the servo clock is an example of the first frequency.

The servo mark is pattern data for determining demodulation timing of the servo data. On the basis of detection timing of the servo mark (specifically, timing t1 in FIG. 4) and a count value of the counter 31, the controller 30 determines the demodulation timing of various kinds of servo data thereafter.

The gray code includes a cylinder address for identifying each of the servo tracks 41 provided on the magnetic disk 11, and a sector address for identifying each of the servo sectors SV on the servo track 41.

The PAD indicates a boundary between the gray code area GC and the burst area NB.

The N burst and the Q burst are pattern data used for detecting a positional deviation amount from the servo track 41, which is indicated by a track number included in the gray code, from a track center. The cylinder address included in the gray code is information corresponding to an integer value in information of a radial position. Information after the decimal point in information of the radial position is obtained by demodulation of the N burst and the Q burst. Hereinafter, the current position of the magnetic head 22 obtained by demodulation of the gray code, the N burst, and the Q burst is referred to as a demodulation position.

An example of a waveform of a servo gate and an example of a waveform of a burst gate are illustrated in FIG. 4. Note that the waveform of the servo gate and the waveform of the burst gate illustrated in FIG. 4 indicate waveforms in the write operation.

The servo gate is a signal transmitted from the processor 26 to the RWC 25, and is a signal indicating a period during which demodulation of the servo data is permitted. In the example illustrated in FIG. 4, a servo gate being at an "H" level indicates that demodulation of the servo data is permitted. A servo gate being at an "L" level indicates that demodulation of the servo data is not permitted. The RWC 25 executes demodulation of the servo data in a period during which the servo gate is at the "H" level.

The burst gate is an internal signal of the RWC 25. The burst gate is a signal indicating a period during which demodulation of a burst pattern (that is, the N burst NB and the Q burst QB) is performed. In the example illustrated in FIG. 4, each timing at which the burst gate rises from the "L" level to the "H" level indicates timing at which demodulation of the burst pattern is started, and each timing at which the burst gate falls from the "H" level to the "L" level indicates timing at which demodulation of the burst pattern is ended. Thus, a period during which the burst gate is maintained at "H" represents a demodulation period of the burst pattern.

Hereinafter, transitioning of a signal, such as the servo gate or the burst gate, from the "L" level to the "H" level is referred to as opening of a gate. Hereinafter, transitioning of the signal, such as the servo gate or the burst gate, from the "H" level to the "L" level is referred to as closing of the gate.

The processor 26 opens the servo gate at preset timing (such as timing t0) at which the read head 22r reaches the preamble area PA. Then, at timing based on the timing at which the servo mark is detected, the RWC 25 executes demodulation of the gray code written in the gray code area GC, demodulation of the N burst written in the burst area NB, demodulation of the Q burst written in the burst area QB, and demodulation of the post code written in the post code area PC.

For example, on the basis of an amount of change in the count value of the counter 31 from the timing at which the servo mark is detected, the RWC 25 determines a period during which the read head 22r passes through the burst area NB such as a period from timing t2 to timing t3, and a period during which the read head 22r passes through the burst area QB such as a period from timing t4 to timing t5. Then, the RWC 25 maintains the burst gate in an open state during the period from the timing t2 to the timing t3 and during the period from the timing t4 to the timing t5, and demodulates the servo data in each of the periods. The RWC 25 acquires, as N-burst demodulation data, servo data read in the period from the timing t2 to the timing t3, during which the burst gate is in the open state. Then, the RWC 25 acquires, as Q-burst demodulation data, servo data read in the period from the timing t4 to the timing t5, during which the burst gate is next in the open state. As described above, the RWC 25 determines the demodulation period of the burst pattern on the basis of the timing at which the servo mark is detected. Note that the length of the period from the timing t2 to the timing t3 and the length of the period from the timing t4 to the timing t5 may be the same or different.

The processor 26 closes the servo gate at preset timing (such as timing t6) at which the read head 22r reaches an end of the post code area PC. Then, the demodulation of the servo data written in the normal servo sector NSV is ended.

Figure 5:
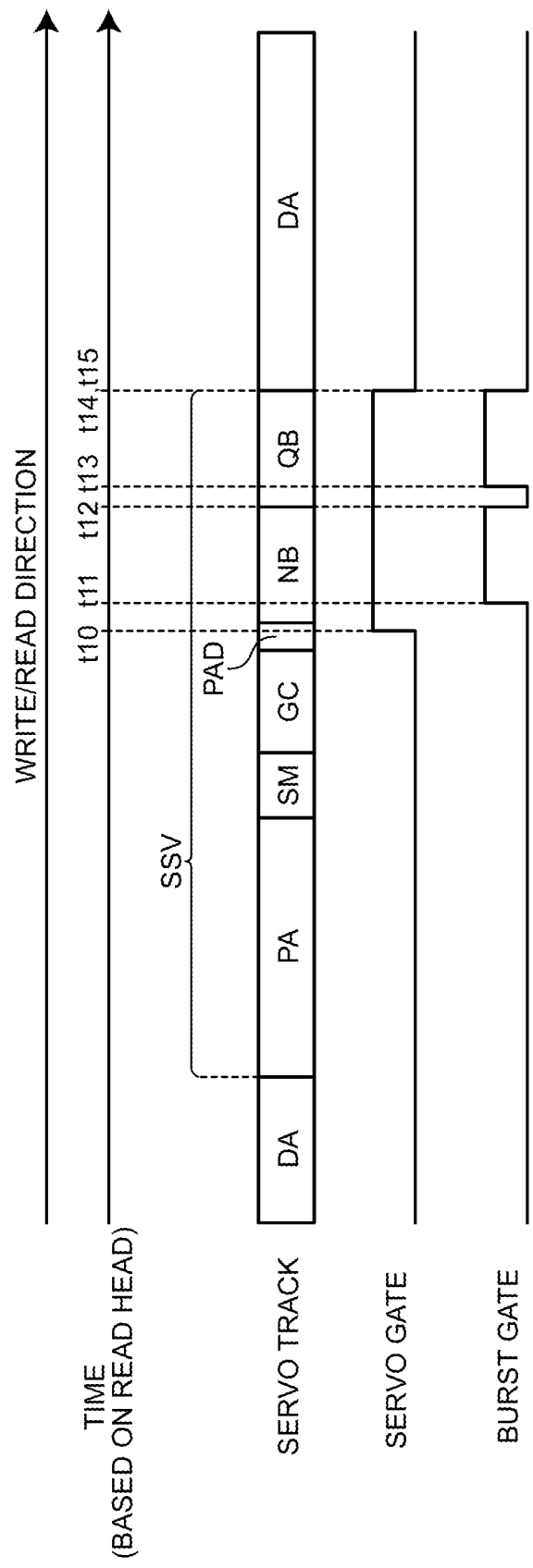
FIG. 5 is a view illustrating an example of a configuration of a short servo sector of the first embodiment.

FIG. 5 is a view illustrating an example of a configuration of the short servo sector SSV of the first embodiment. In FIG. 5, the configuration of the short servo sector SSV and a time axis indicating time at which the read head 22r is located on the short servo sector SSV. In addition, an example of a waveform of a servo gate and an example of a waveform of a burst gate are illustrated. The waveform of the servo gate and the waveform of the burst gate illustrated in FIG. 5 indicate waveforms in the write operation.

In the short servo sector SSV, a preamble area PA where a preamble is recorded, a servo mark area SM where a servo mark is recorded, a gray code area GC where a gray code is recorded, a pad area PAD where a PAD is recorded, a burst area NB where an N burst is recorded, and a burst area QB where a Q burst is recorded, are arranged in this order in the write/read direction. A data area DA is provided immediately after the burst area QB. That is, in the example illustrated in FIG. 5, the short servo sector SSV has a configuration in which the post code area PC is omitted from the normal servo sector NSV illustrated in FIG. 4.

A length in the circumferential direction of each of the areas included in the short servo sector SSV may be the same as or different from the length of the area having the same name and included in the normal servo sector NSV.

In the write operation, when the read head 22r passes through the short servo sector SSV, for example, the processor 26 opens the servo gate at preset timing (such as timing t10) immediately before the read head 22r reaches a head of the burst area NB, and closes the servo gate at preset timing (such as timing t15) at which the read head 22r reaches an end of the burst area QB. Thus, according to a waveform of this servo gate, servo data is not read in a period during which the magnetic head 22 passes through a front part of the short servo sector SSV, that is, the preamble area PA, the servo mark area SM, and the gray code area GC in the example illustrated in FIG. 5. Therefore, the controller 30 can write data to a vicinity of the start of the short servo sector SSV in the data area DA immediately in front of the short servo sector SSV.

In a period from the timing t10 to the timing t15 during which the servo gate is open, the RWC 25 operates the burst gate and demodulates burst data in a period during which the burst gate is open. Specifically, on the basis of an amount of change in the count value of the counter 31 from timing at which a servo mark is detected in an immediately preceding normal servo sector NSV, the RWC 25 determines, for example, a period during which the read head 22r passes through the burst area NB such as a period from timing t11 to timing t12, and a period during which the read head 22r passes through the burst area QB such as a period from timing t13 to timing t14. The RWC 25 maintains the burst gate in an open state during the period from the timing t11 to the timing t12 and during the period from the timing t13 to the timing t14, and demodulates the servo data in each of the periods. The RWC 25 acquires, as N-burst demodulation data, servo data read in the period from the timing t11 to the timing t12, and acquires, as Q-burst demodulation data, servo data read in the period from the timing t13 to the timing t14. As described above, in the short servo sector SSV, the RWC 25 determines the demodulation period of the burst pattern on the basis of the timing at which the servo mark is detected in the immediately preceding normal servo sector NSV. Note that the period from the timing t11 to the timing t12 and the period from the timing t13 to the timing t14 may be the same or different.

Figure 6:
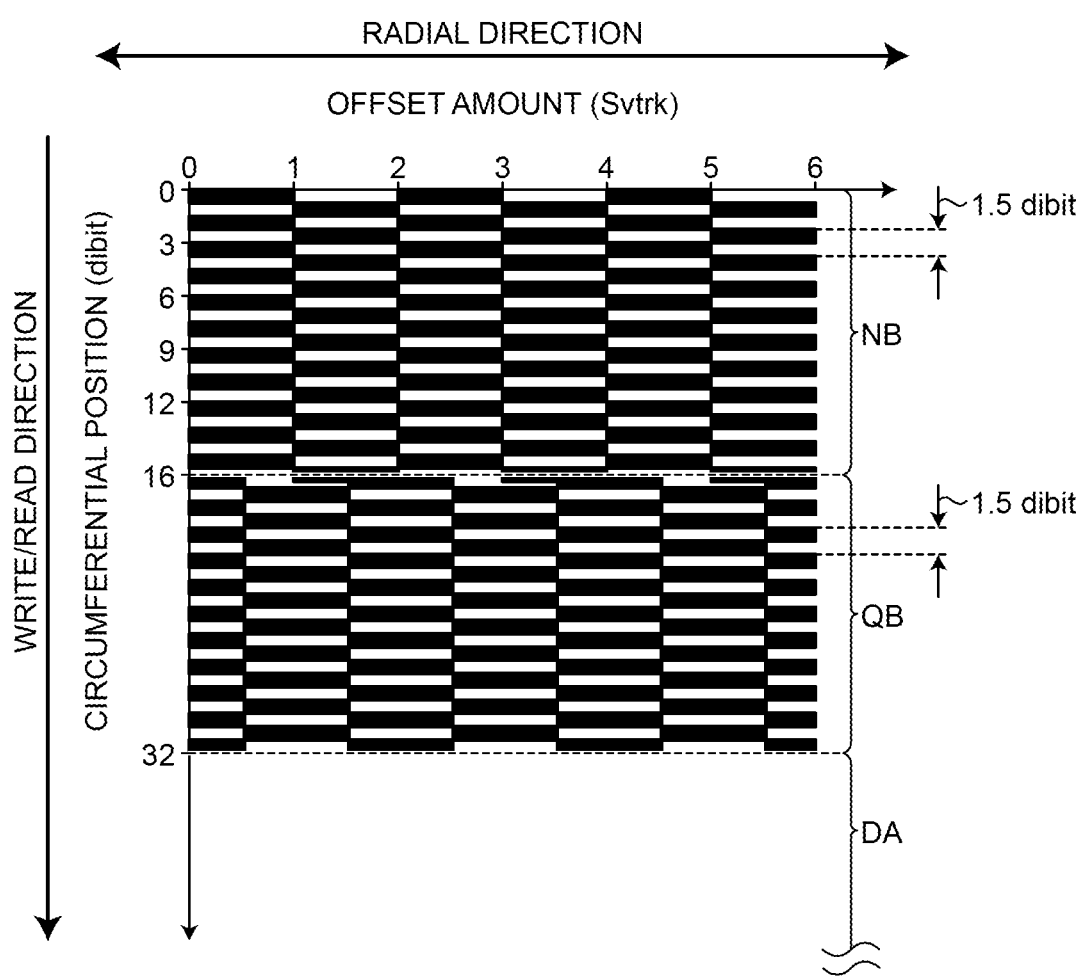
FIG. 6 is a schematic diagram illustrating an example of a configuration of an N burst and a Q burst written in the short servo sector of the first embodiment.

FIG. 6 is a schematic diagram illustrating an example of a configuration of the N burst and the Q burst written in the short servo sector SSV of the first embodiment. The horizontal axis represents an offset amount of a servo track from the track center. The vertical axis represents a circumferential position with a start of a burst area NB as the origin. A dark colored pattern indicates one of two values having different polarities (magnetization of + polarity), and a white pattern indicates the other of the two values (magnetization of − polarity).

In and after description related to FIG. 6, "dibit" is used as a unit expressing a length of the servo waveform in the circumferential direction or time. A recording frequency of a preamble and a frequency of a servo clock are determined in such a manner that the recording frequency of the preamble is equal to ¼ times the frequency of the servo clock. Thus, when a distance or time, in which the magnetic head 22 moves in the circumferential direction by a servo clock of one clock, is expressed as SFGclk, a period of the preamble corresponds to 4×SFGclk. 1 dibit represents 4×SFGclk. Thus, 1 dibit corresponds to one period of the preamble. The vertical axis in FIG. 6 indicates a circumferential position based on the start of the burst area NB in units of dibit.

In addition, a length in the radial direction may be expressed in servo track units, in other words, in units of a spatial length by which a servo track pitch is regarded as 1. The unit of the spatial length by which the servo track pitch is regarded as 1 is expressed as Svtrk. The horizontal axis in FIG. 6 indicates the offset amount in units of Svtrk.

In the example illustrated in FIG. 6, each of the burst area NB and the burst area QB has a length of 16 dibit in the circumferential direction. Each of the N burst and the Q burst has a configuration that the polarity is inverted every 0.75 dibit in the circumferential direction. Thus, each of the N burst and the Q burst has a period change pattern of 1.5 dibit in the circumferential direction.

In the radial direction, the polarity of each of the N burst and the Q burst is reversed every 1 Svtrk. That is, each of the N burst and the Q burst has a period change pattern of 2 Svtrk in the radial direction. The N burst is recorded in such a manner that maximum amplitude is acquired at a position that is offset by 0.5 Svtrk from the track center. In addition, the Q burst is recorded in such a manner that maximum amplitude is acquired at the track center.

The N burst and the Q burst have such configurations above, so that the period of each of the N burst and the Q burst in the circumferential direction is 1.5 times the period of the preamble. Thus, the recording frequencies of the N burst and the Q burst in the circumferential direction are ⅙ times the frequency of the servo clock. In addition, the recording frequencies of the N burst and the Q burst in the circumferential direction are ⅔ times the recording frequency of the preamble.

Note that, as described above, the cycle in the circumferential direction, that is, a burst period of each of the N burst and the Q burst is 1.5 dibit. Thus, when a concept of a phase is introduced for each burst pattern, 1.5 dibit corresponds to 360 degrees in the circumferential direction. Hereinafter, since 360 degrees corresponds to 1.5 dibit, a phase may also be expressed by dibit. In addition, not only the phase in the circumferential direction but also a change in the phase in the radial direction may be expressed by dibit on the assumption that a phase change of 180 degrees of when a polarity of a burst pattern is inverted when the offset of 1 Svtrk is performed in the radial direction corresponds to 0.75 dibit.

FIG. 6 is only a schematic diagram illustrating an example. Depending on performance of the write head 22w, a boundary between the pattern in dark color and the pattern in white can be recorded ambiguously. In addition, lengths of the burst area NB and the burst area QB in the circumferential direction are not limited to the lengths described above. The length of the burst area NB in the circumferential direction and the length of the burst area QB in the circumferential direction may be different from each other.

As described above, the RWC 25 demodulates the burst pattern (that is, each of the N burst and the Q burst) in a period during which the burst gate is open. The period during which the burst gate is open, that is, the demodulation period of the burst pattern, is referred to as a burst demodulation window. In the demodulation operation, the RWC 25 captures, in the burst demodulation window, the burst pattern at sampling intervals based on the servo clock, that is, the frequency of the servo clock. The RWC 25 performs, for example, discrete Fourier transform (DFT) processing on a servo sampled waveform acquired as a result of the capturing, and acquires a phase and amplitude of a demodulation signal of the burst pattern. The RWC 25 acquires a phase and amplitude from each of the N burst and the Q burst, and acquires a demodulation position on the basis of the acquired phase and amplitude.

Note that, hereinafter, the phase refers to a phase of a waveform obtained by performing sampling on the burst pattern (in other words, a burst waveform) in the burst demodulation window. The amplitude refers to amplitude of the burst waveform.

Figure 7:
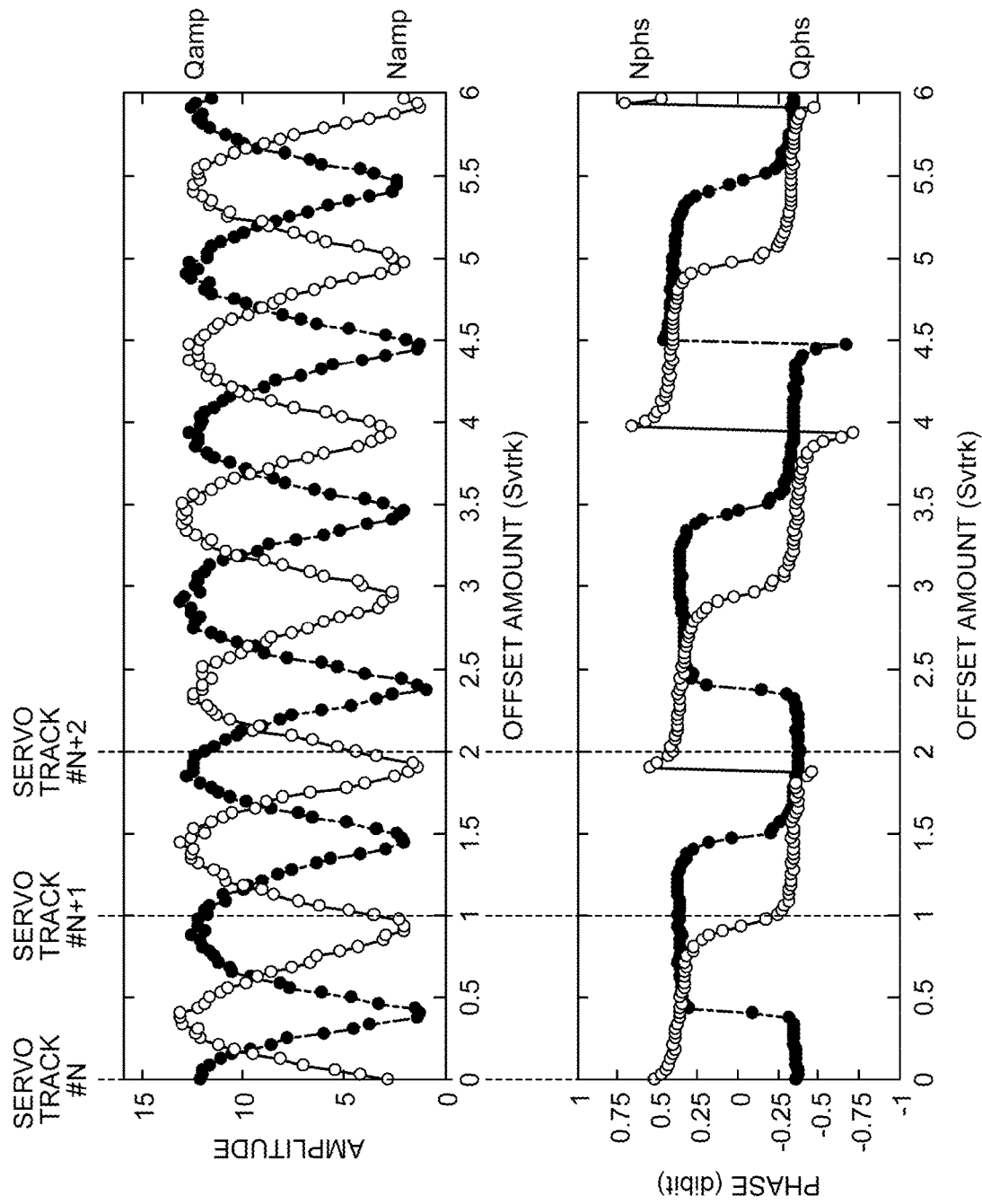
FIG. 7 is a view illustrating amplitude and a phase with respect to an offset amount, the amplitude and the phase being acquired when each of the N burst and the Q burst of the first embodiment is demodulated by an RWC in a burst demodulation window.

FIG. 7 is a view illustrating amplitude and a phase with respect to an offset amount, the amplitude and the phase being acquired when each of the N burst and the Q burst of the first embodiment is demodulated by the RWC 25 in the burst demodulation window. The phase is expressed by dibit. Moreover, as an example of the offset amount, an offset amount of a servo track #N, which is a servo track to which N is given as a track number, from the track center is illustrated. That is, a position that is offset by 1 Svtrk from the servo track #N corresponds to a track center of a servo track #N+1, and a position that is offset by 2 Svtrk from the servo track #N corresponds to a track center of a servo track #N+2.

As illustrated in FIG. 7, amplitude Namp of the N burst has a profile that takes a peak at a position deviated for about 0.5 Svtrk from the track center of each servo track and takes a minimum at the track center of each servo track. Amplitude Qamp of the Q burst has a profile that takes a peak at the track center of each servo track and takes a minimum at a position deviated for about 0.5 Svtrk from the track center of each servo track.

A phase Nphs of the N burst changes by 0.75 dibit, that is, 180 degrees every 1 Svtrk. A phase Qphs of the Q burst changes by 0.75 dibit, that is, 180 degrees every 1 Svtrk. The phase Qphs of the Q burst has a profile deviated for 0.5 Svtrk in the radial direction from the phase Nphs of the N burst.

A first technique to be compared with the first embodiment will be described. The first technique to be compared with the first embodiment will be referred to as a first comparative example. According to the first comparative example, a burst pattern is configured in such a manner that a burst period, that is, a period in a circumferential direction of the burst pattern is 2 dibit. In the first comparative example, when the burst pattern is deviated for 1 Svtrk in a radial direction, a polarity thereof is inverted, and a phase thereof changes for 180 degrees, that is, 1 dibit.

As described above, in the normal servo sector NSV, the burst demodulation window in the normal servo sector NSV is generated on the basis of the detection timing of the servo mark recorded in the servo mark area SM in the normal servo sector NSV. On the other hand, in the short servo sector SSV, the burst demodulation window is generated based on the timing at which the servo mark is detected in the immediately preceding normal servo sector NSV. In the short servo sector SSV, time from the detection timing of the servo mark to when the magnetic head reaches the burst areas NB and QB is significantly longer than that in a case of the normal servo sector NSV. Thus, in the short servo sector SSV, the burst gate opening/closing timing, that is, the burst demodulation window is likely to deviate from intended timing due to rotational fluctuation of the magnetic disk from the servo mark detection timing until the magnetic head reaches the burst areas NB and QB. When opening/closing timing of the burst gate is deviated from intended timing, a demodulation result of the burst pattern fluctuates, and a demodulation position calculated on the basis of the demodulation result of the burst pattern may be incorrect. When the incorrect demodulation position is used for positioning control, accuracy of the positioning control is deteriorated.

According to the first comparative example, in comparison between a case where a position of a magnetic head is deviated for 1 Svtrk in the radial direction and a case where opening/closing timing of a burst gate is deviated for a length corresponding to 1 dibit, the read servo waveforms look the same. Thus, it is difficult to determine whether a demodulation position that can be calculated from the servo waveform is the incorrect demodulation position caused by the deviation of the opening/closing timing of the burst gate or whether the position of the magnetic head in the radial direction is actually deviated. Due to this difficulty, accuracy of the positioning control may be deteriorated.

On the other hand, according to the first embodiment of the present disclosure, the burst pattern is configured in such a manner that the burst period, that is, the period of the burst pattern in the circumferential direction is 1.5 dibit. In other words, the burst pattern is configured in such a manner that the recording frequency of the burst pattern is ⅔ times the recording frequency of the preamble. As a result, it is possible to distinguish between the positional deviation of the magnetic head 22 in the radial direction and the incorrect demodulation position deviation caused by the deviation of the opening/closing timing of the burst gate. That is, deterioration in the accuracy of the positioning control is suppressed.

Hereinafter, the deviation of the burst demodulation window is referred to as a timing deviation.

Figure 8:
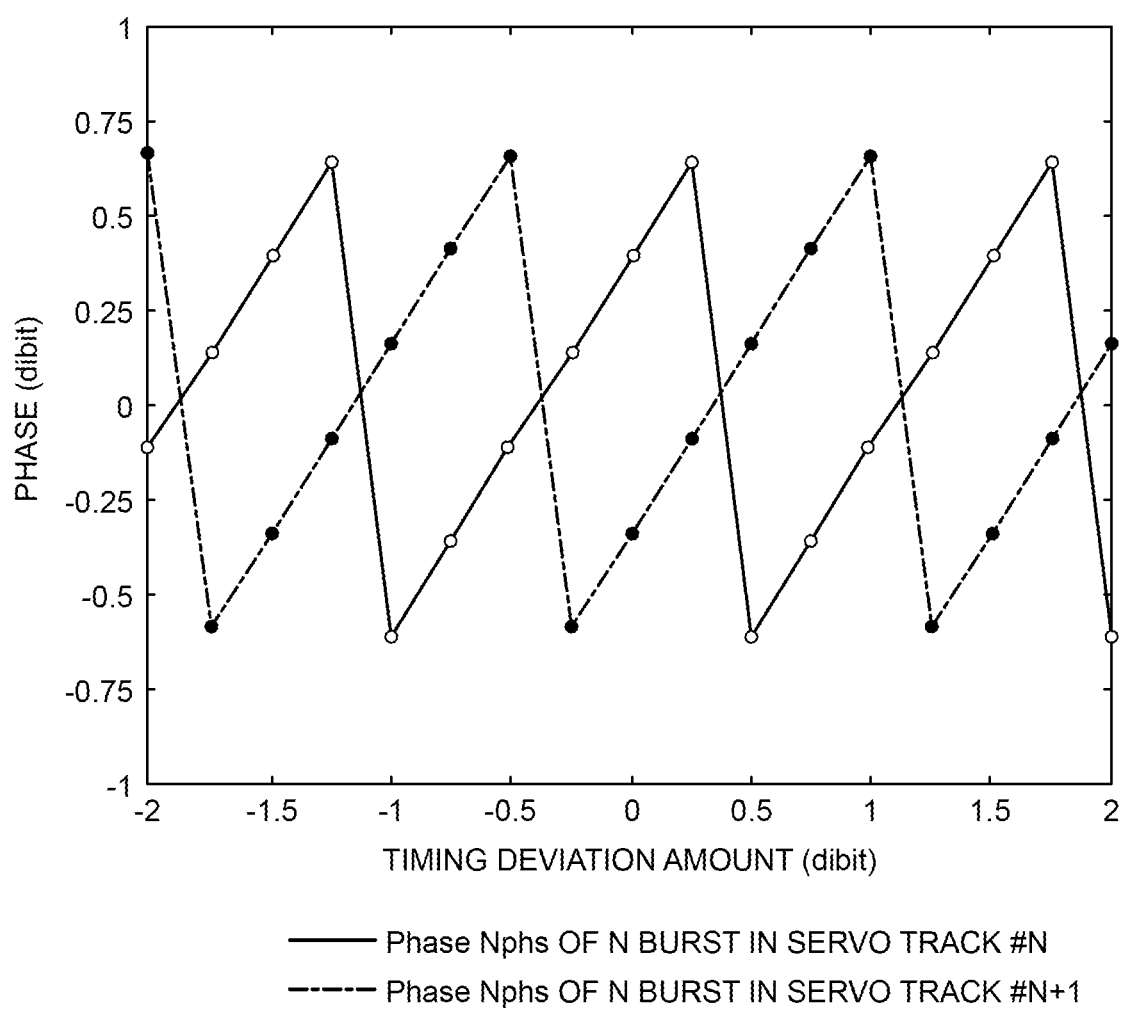
FIG. 8 is a view illustrating an example of a relationship between a phase of the N burst and a timing deviation amount in a case where a burst pattern of the first embodiment is used.

FIG. 8 is a view illustrating an example of a relationship between a phase of the N burst and a timing deviation amount in a case where the burst pattern of the first embodiment is used. In FIG. 8, a change in the phase Nphs of the N burst in the servo track #N and a change in the phase of the N burst in the servo track #N+1 are illustrated.

As illustrated in FIG. 8, the phase Nphs increases as the timing deviation amount increases. When an increase amount of the timing deviation amount is 1 dibit, an increase amount of the phase Nphs is 1 dibit. When the phase Nphs reaches 0.75 dibit according to the increase in the timing deviation amount, the phase Nphs is folded back to −0.75 dibit, and the increase corresponding to the increase in the timing deviation amount is resumed from −0.75 dibit.

In addition, a phase of the burst pattern changes by 180 degrees, that is, 0.75 dibit every 1 Svtrk in the radial direction. Thus, in all servo tracks with even track numbers, the phase Nphs exhibits the same change with respect to the timing deviation amount. In addition, in all servo tracks with odd track numbers, the phase Nphs exhibits the same change with respect to the timing deviation amount. Moreover, in the servo tracks having the odd track numbers, the phase Nphs changes while being deviated for 0.75 dibit from the change in the phase Nphs with respect to the timing deviation amount in the servo tracks having the even track numbers. Thus, as illustrated as an example in FIG. 8, the phase Nphs in the servo track #N+1 changes by being shifted for 0.75 dibit from the change with respect to the timing deviation amount of the phase Nphs in the servo track #N.

In the first embodiment, each component of the magnetic disk device 1 is designed in such a manner that only approximately discrete deviation is generated in the burst demodulation window in increments of 1 dibit from a state without timing deviation. That is, the magnetic disk device 1 is configured in such a manner that the timing deviation amount is an integer value or a value near an integer value in dibit notation. An example of a relationship between the phase Nphs of the N burst and the timing deviation amount, which is acquired in the magnetic disk device 1 having such a configuration, is illustrated in FIG. 9.

Points P1 to P5 are obtained by cutting out parts, whose timing deviation amounts are each an integer value, from a graph of the change in the phase Nphs of the N burst in the servo track #N illustrated in FIG. 8. Points P11 to P15 are obtained by cutting out parts, whose timing deviation amounts are each an integer value, from a graph of the change in the phase Nphs of the N burst in the servo track #N+1 illustrated in FIG. 8. In the magnetic disk device 1 of the first embodiment, the phase Nphs at any of the points P1 to P5 and P11 to P15 can be observed.

Figure 9:
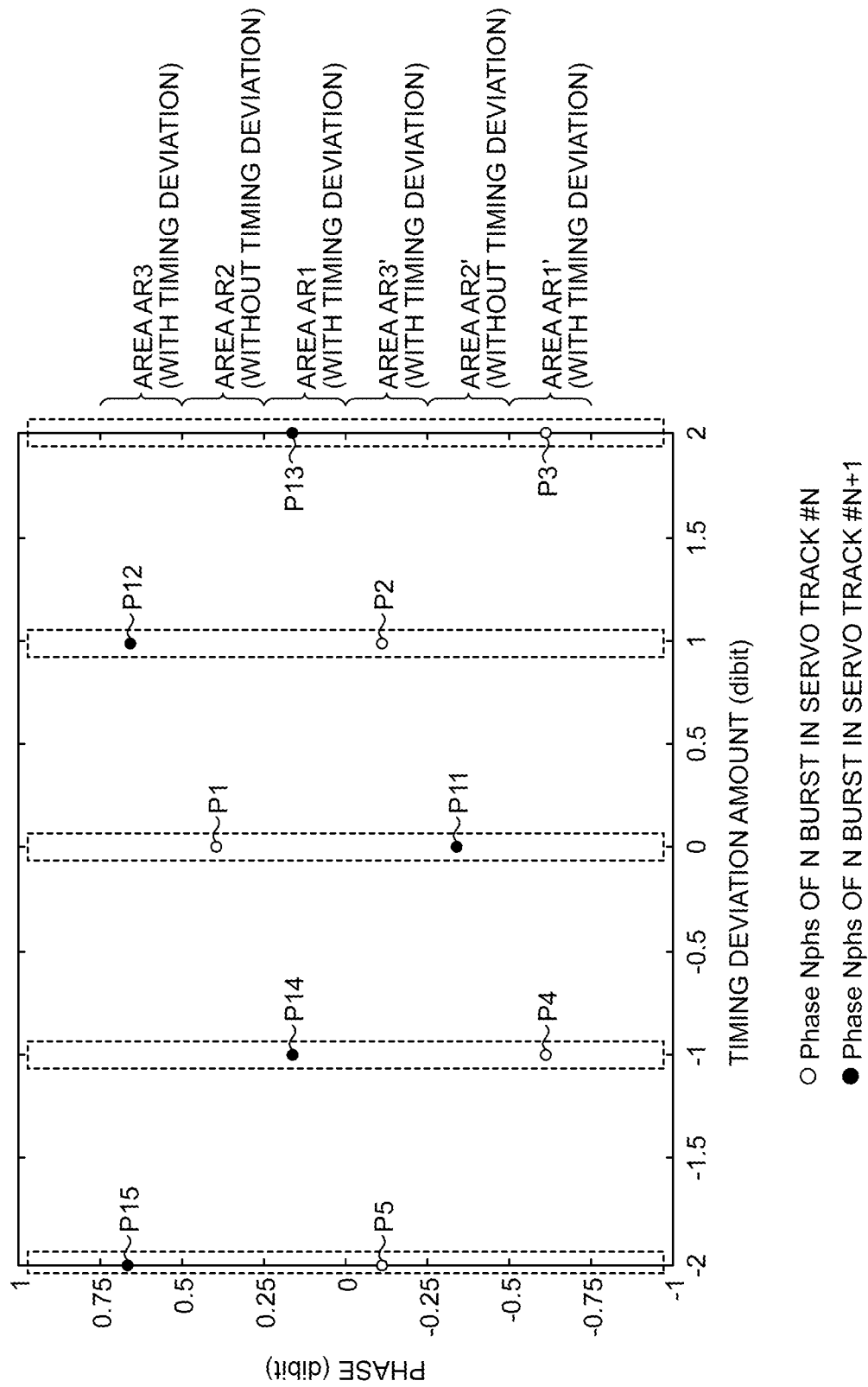
FIG. 9 is a view illustrating an example of a relationship between the phase of the N burst and a timing deviation amount, the relationship being acquired in the magnetic disk device of the first embodiment.

In FIG. 9, when a case where the timing deviation amount is −1, 0, or 1 is focused on, a phase at the point P1, P2, P4, P11, P12, or P14 is observed. The points P1, P2, P4, P11, P12, and P14 represent different phases.

That is, according to the first embodiment, unlike the first comparative example, it can be seen that it is possible to distinguish, by using the observed phase, whether the deviation of the burst demodulation window is generated or the deviation of the magnetic head 22 in the radial direction is generated.

More specifically, regarding the phase Nphs, in a case where a range from 0 dibit to 0.25 dibit is referred to as an area AR1, a range from 0.25 dibit to 0.5 dibit is referred to as an area AR2, a range from 0.5 dibit to 0.75 dibit is referred to as an area AR3, a range from −0.75 dibit to −0.5 dibit is referred to as an area AR1', a range from −0.5 dibit to −0.25 dibit is referred to as an area AR2', and a range from −0.25 dibit to 0 dibit is referred to as an area AR3', it is possible to specify whether the timing deviation is generated and whether the deviation of the magnetic head 22 in the radial direction is generated, by determining an area in which the observed phase is included.

Note that the burst period is 1.5 dibit. Therefore, when each part where the timing deviation amount is an integer value is focused on, the same phase Nphs is observed at two points where a difference in the timing deviation amount is 3 dibit. For example, the phase Nphs has the same value in a case where the timing deviation amount is −2 dibit and in a case where the timing deviation amount is 1 dibit. In addition, the phase Nphs is the same value in a case where the timing deviation amount is −1 dibit and in a case where the timing deviation amount is +2 dibit. Thus, when the timing deviation amount is limited to −2, −1, 0, 1, or 2, it is possible to determine at least presence or absence of the timing deviation on the basis of whether the phase Nphs is included in any of the area AR2 and the area AR2'.

Here, as an example, in a case where the observed phase is included in the areas AR1' to AR3', in other words, in a case where a sign of the observed phase is negative, the controller 30 executes a folding operation of adding 0.75 dibit to the observed phase.

Figure 10:
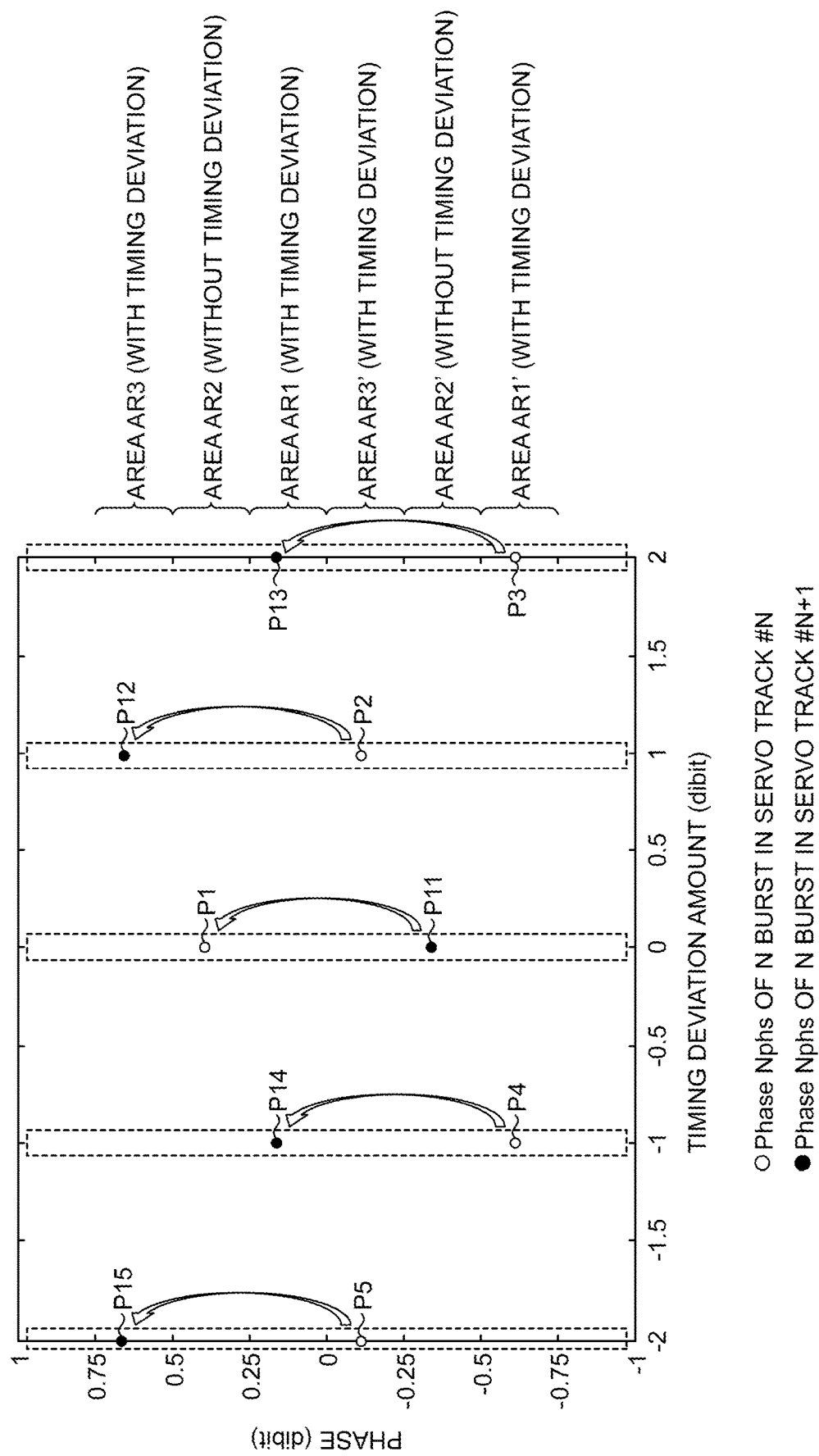
FIG. 10 is a view for describing a folding operation of the first embodiment.

FIG. 10 is a view for describing the folding operation of the first embodiment.

For example, the point P11 included in the area AR2' is moved by the folding operation to the area AR2 including the point P1. The point P2 included in the area AR3' is moved by the folding operation to the area AR3 including the point P12. The point P4 included in the area AR1' is moved by the folding operation to the area AR1 including the point P14.

Thus, when the timing deviation amount is −2, −1, 0, 1, or 2, in a case where the burst demodulation window is not deviated, the phase Nphs is observed in the area AR2 regardless of a servo track on which the magnetic head 22 is located. In a case where the burst demodulation window is deviated, the phase Nphs is observed in the area AR1 or the area AR3 regardless of a servo track on which the magnetic head 22 is located.

The controller 30 determines whether the burst demodulation window is deviated, on the basis of whether the phase Nphs after the folding operation is included in the area AR2.

Note that the controller 30 does not necessarily perform the folding operation. The controller 30 may determine whether the burst demodulation window is deviated, on the basis of whether the phase Nphs is included in the area AR2 or the area AR2' without performing the folding operation.

Note that an example of determining whether the burst demodulation window is deviated on the basis of the phase Nphs has been described above. To determine whether the burst demodulation window is deviated, the phase Qphs can be used instead of the phase Nphs. In the description of the first embodiment, whether the burst demodulation window is deviated is determined on the basis of the phase Nphs.

After calculating the demodulation position by demodulation of the burst pattern, the controller 30 determines whether the burst demodulation window is deviated by the method described above. Then, the demodulation position is corrected on the basis of whether the burst demodulation window is deviated. The operation of correcting the demodulation position is referred to as a demodulation position correction operation.

Figure 11:
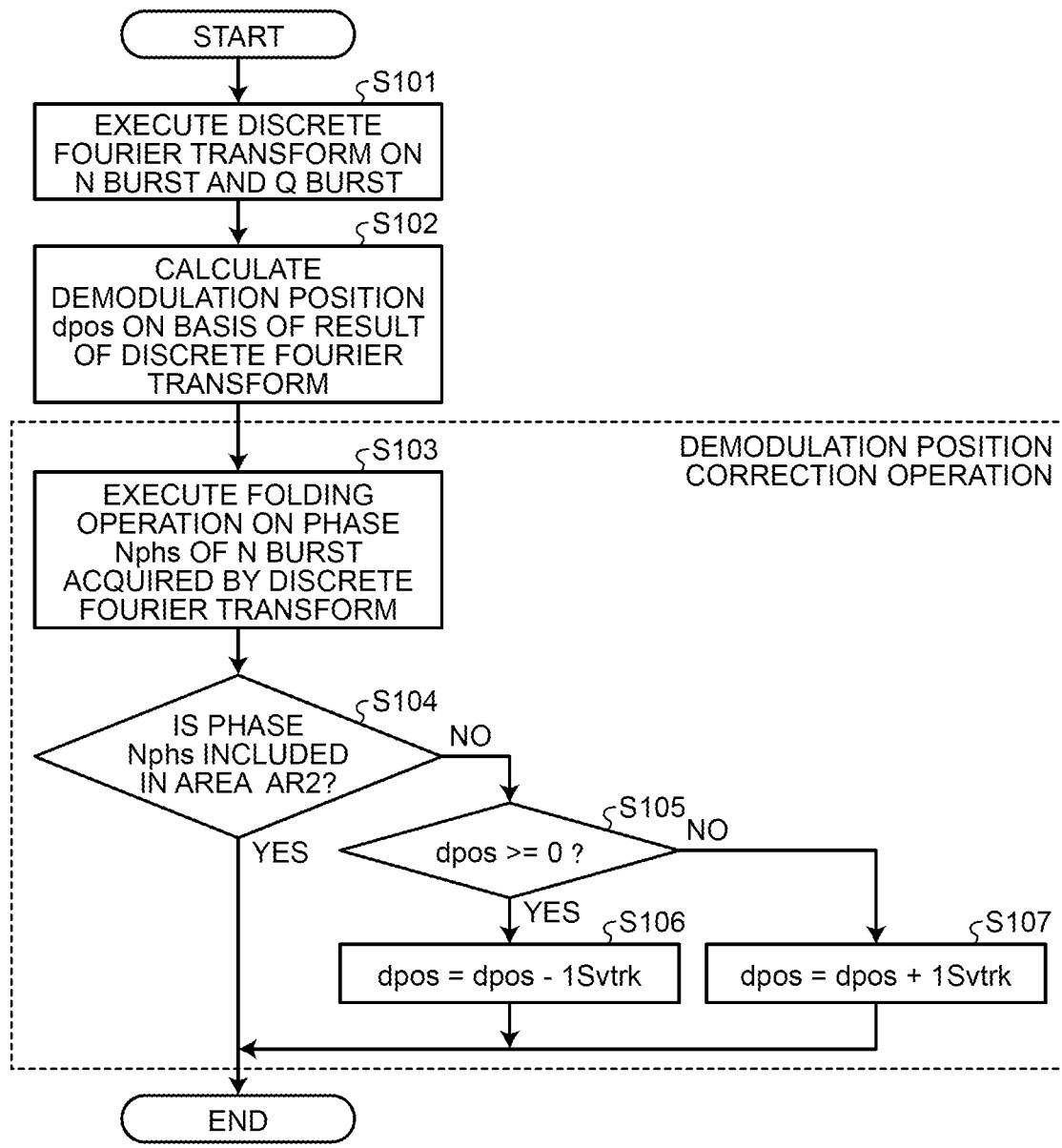
FIG. 11 is a flowchart for describing an example of a method of calculating a demodulation position in the short servo sector of the first embodiment.

FIG. 11 is a flowchart for describing an example of a method of calculating a demodulation position in the short servo sector SSV of the first embodiment.

When the magnetic head 22 passes through the burst areas NB and QB of the short servo sector SSV, the controller 30 executes discrete Fourier transform on the N burst and the Q burst that have been read from the respective burst areas (S101). As described above, the controller 30 performs sampling on the burst data read in the burst demodulation window corresponding to each of the N burst and the Q burst, and executes the discrete Fourier transform on each waveform obtained by the sampling.

As a result of the processing of Step S101, the controller 30 acquires the amplitude Namp and Qamp, and the phases Nphs and Qphs. The controller 30 calculates a demodulation position dpos on the basis of the acquired information (S102).

Note that the demodulation position dpos indicates a calculated value of an offset amount based on a track center of a servo track 41 indicated by a track number included in a gray code demodulated in an immediately preceding normal servo sector NSV. Description of a method of calculating the demodulation position dpos on the basis of a result of the discrete Fourier transform is omitted.

Subsequently, the controller 30 executes the demodulation position correction operation on the demodulation position dpos.

In the demodulation position correction operation, the controller 30 executes the folding operation described with reference to FIG. 10 on the phase Nphs of the N burst that has been obtained by the discrete Fourier transform (S103). Specifically, in a case where a sign of the phase Nphs is negative, the controller 30 adds 0.75 dibit to the phase Nphs. In a case where the sign of the phase Nphs is positive, the controller 30 does not add 0.75 dibit to the phase Nphs.

The controller 30 determines whether the phase Nphs for which the folding operation has been executed is included in the area AR2 (S104).

Specifically, the controller 30 determines whether the phase Nphs is included in the area AR2 by comparing the phase Nphs with a first threshold corresponding to a boundary between the area AR1 and the area AR2 and with a second threshold corresponding to a boundary between the area AR2 and the area AR3. In the examples illustrated in FIG. 9 and FIG. 10, the first threshold is 0.25 dibit, and the second threshold is 0.5 dibit. Note that example of the first threshold and the second threshold is not limited to the above. In a case where the phase Nphs is larger than the first threshold and the phase Nphs is smaller than the second threshold, the controller 30 determines that the phase Nphs is included in the area AR2. In a case where the phase Nphs is smaller than the first threshold or the phase Nphs is larger than the second threshold, the controller 30 determines that the phase Nphs is not included in the area AR2. In a case where the phase Nphs is equal to the first threshold or the phase Nphs is equal to the second threshold, the controller 30 may determine that the phase Nphs is included in the area AR2 or the phase Nphs is not included in the area AR2.

In a case where the phase Nphs is included in the area AR2 (S104: Yes), it is estimated that there is no timing deviation. In this case, the controller 30 ends the calculation of the demodulation position. The controller 30 uses the demodulation position dpos obtained by the processing of Step S102 as it is for the positioning control.

In a case where the phase Nphs is not included in the area AR2 (S104: No), it is estimated that there is the timing deviation. In such a case, the controller 30 corrects the demodulation position dpos on the basis of a sign of the demodulation position dpos.

More specifically, the controller 30 determines whether the demodulation position dpos is 0 or more (S105). In a case where the demodulation position dpos is 0 or more (S105: Yes), the controller 30 performs correction by subtracting 1 Svtrk from the demodulation position dpos (S106). In a case where the demodulation position dpos is less than 0 (S105: No), the controller 30 performs correction by adding 1 Svtrk to the demodulation position dpos (S107).

Note that the processing of a case where the demodulation position dpos is equal to 0 is not limited to the example described above. In a case where the demodulation position dpos is equal to 0, the controller 30 may execute the processing of Step S107.

After the processing of Step S106 or Step S107, the controller 30 ends the calculation of the demodulation position. The controller 30 uses the demodulation position dpos corrected by the processing of Step S106 or Step S107 for the positioning control.

As described above, according to the first embodiment, the burst pattern is recorded in the short servo sector SSV of the magnetic disk 11 at a recording frequency of ⅔ times the recording frequency of the preamble. The controller 30 determines the burst demodulation window while the magnetic head 22 passes through the short servo sector SSV, and performs sampling on the burst pattern at the frequency of the servo clock in the burst demodulation window. Then, the controller 30 executes demodulation, that is, processing of the discrete Fourier transform, for example, on sampling waveform data obtained by the sampling, and acquires the phase (such as the phase Nphs or the phase Qphs) and the demodulation position dpos. The controller 30 corrects the demodulation position dpos on the basis of the phase (such as the phase Nphs or the phase Qphs), and executes the positioning control of the magnetic head 22 on the basis of a post-correction demodulated position dpos.

With this configuration, it becomes possible to distinguish between an actually-generated positional deviation of the magnetic head 22 in the radial direction and an incorrect deviation of the demodulation position due to deviation of the opening/closing timing of the burst gate. Thus, the accuracy of the positioning control can be improved as compared with the first comparative example.

In the above example, the burst pattern is recorded at a recording frequency ⅔ times the recording frequency of the preamble. More specifically, the recording frequency of the preamble is ¼ times the frequency of the servo clock, and the recording frequency of the burst pattern is ⅙ times the frequency of the servo clock. As a result, the recording frequency of the burst pattern is ⅔ times the recording frequency of the preamble. The relationship between the recording frequency of the burst pattern and the recording frequency of the preamble is not limited to these examples.

The relationship between the recording frequency of the burst pattern and the recording frequency of the preamble can be optionally determined as long as the condition is satisfied such that the recording frequency of the preamble is 1/K (K is a positive integer) of the frequency of the servo clock, the recording frequency of the burst pattern is 1/L (L is a positive integer) of the frequency of the servo clock, and the recording frequency of the preamble is different from an even multiple of the recording frequency of the burst pattern.

Moreover, in the first embodiment, the controller 30 determines whether there is the timing deviation of the burst demodulation window, on the basis of the phase of the sampled waveform of the burst pattern, such as the phase Nphs or the phase Qphs. In a case where there is the timing deviation of the burst demodulation window, the controller 30 corrects the demodulation position dpos and uses the corrected one. In a case where there is no timing deviation of the burst demodulation window, the controller 30 uses the demodulation position dpos as it is.

Specifically, in a case where there is the timing deviation of the burst demodulation window, the controller 30 performs correction described below on the demodulation position dpos. That is, when a sign of the demodulation position dpos is positive, correction of subtracting 1 Svtrk from the demodulation position dpos is performed on the demodulation position dpos. When the sign of the demodulation position dpos is negative, correction of adding 1 Svtrk to the demodulation position dpos is performed on the demodulation position dpos.

In the first embodiment, the demodulation position correction operation is executed in the short servo sector SSV. The magnetic disk device 1 may be configured in such a manner that the demodulation position correction operation is also executed in the normal servo sector NSV. That is, also in the normal servo sector NSV, the N burst and the Q burst may have the configuration illustrated in FIG. 6, and the controller 30 may execute the operation illustrated in FIG. 11 in the normal servo sector NSV.

Moreover, in the first embodiment, as illustrated in FIG. 5, the data area DA is provided immediately after the burst area (specifically, the burst area QB) of the short servo sector SSV.

A second technique to be compared with the first embodiment will be described. The second technique to be compared with the first embodiment will be referred to as a second comparative example. According to the second comparative example, auxiliary pattern data used for determining the timing deviation of a burst demodulation window in a short servo sector SSV is provided after a burst area QB. The controller demodulates the auxiliary pattern data in addition to an N burst and a Q burst, and determines whether there is the timing deviation of the burst demodulation window.

However, according to the second comparative example, an area usable for the data area DA reduces by an area where the auxiliary pattern data is recorded. That is, format efficiency decreases.

In the first embodiment, the area for the auxiliary pattern data is omitted immediately after the burst area (specifically, the burst area QB). Therefore, format efficiency is higher than that of the second comparative example.

Second Embodiment

In the first embodiment, in the demodulation position correction operation, the phase Nphs of the N burst or the phase Qphs of the Q burst is used for determination of presence or absence of the timing deviation. The phase used for determination of the presence or absence of the timing deviation is not limited to the above. In the second embodiment, an example of a variation of a phase used for determination of presence or absence of timing deviation will be described.

When the read head 22r passes through a vicinity of a boundary where a polarity of a burst pattern changes in a radial direction of the magnetic disk 11, amplitude of a demodulation signal obtained by discrete Fourier transform becomes significantly small, and this may deteriorate accuracy of a demodulation position. As a technique of controlling the deterioration of the accuracy of the demodulation position due to passage of the read head 22r through the vicinity of the boundary where the polarity of the burst pattern changes, an initial phase correction operation is known.

According to the initial phase correction operation, a phase obtained by the discrete Fourier transform is corrected in such a manner that amplitude of a demodulation signal becomes as large as possible. More specifically, in a case where a phase of a waveform obtained by performing sampling on a burst pattern is deviated from 0 degree, the phase of the sampled waveform is corrected to be 0 degree or 90 degrees, and the demodulation position is calculated on the basis of data calculated by utilization of a cosine function or a sine function after the correction. A phase correction amount, that is, an initial phase correction value is obtained by performing weighted addition on a phase Nphs of an N burst and a phase Qphs of a Q burst. Each weight used in the weighted addition is determined in accordance with a ratio R between a value obtained by squaring of amplitude Namp of the N burst and a value obtained by squaring of amplitude Qamp of the Q burst.

In the second embodiment, the initial phase correction value used in the initial phase correction operation is used for determining whether there is the time deviation. Hereinafter, contents different from those of the first embodiment will be described, and contents that are the same as those of the first embodiment will not be described or will be briefly described.

Figure 12:
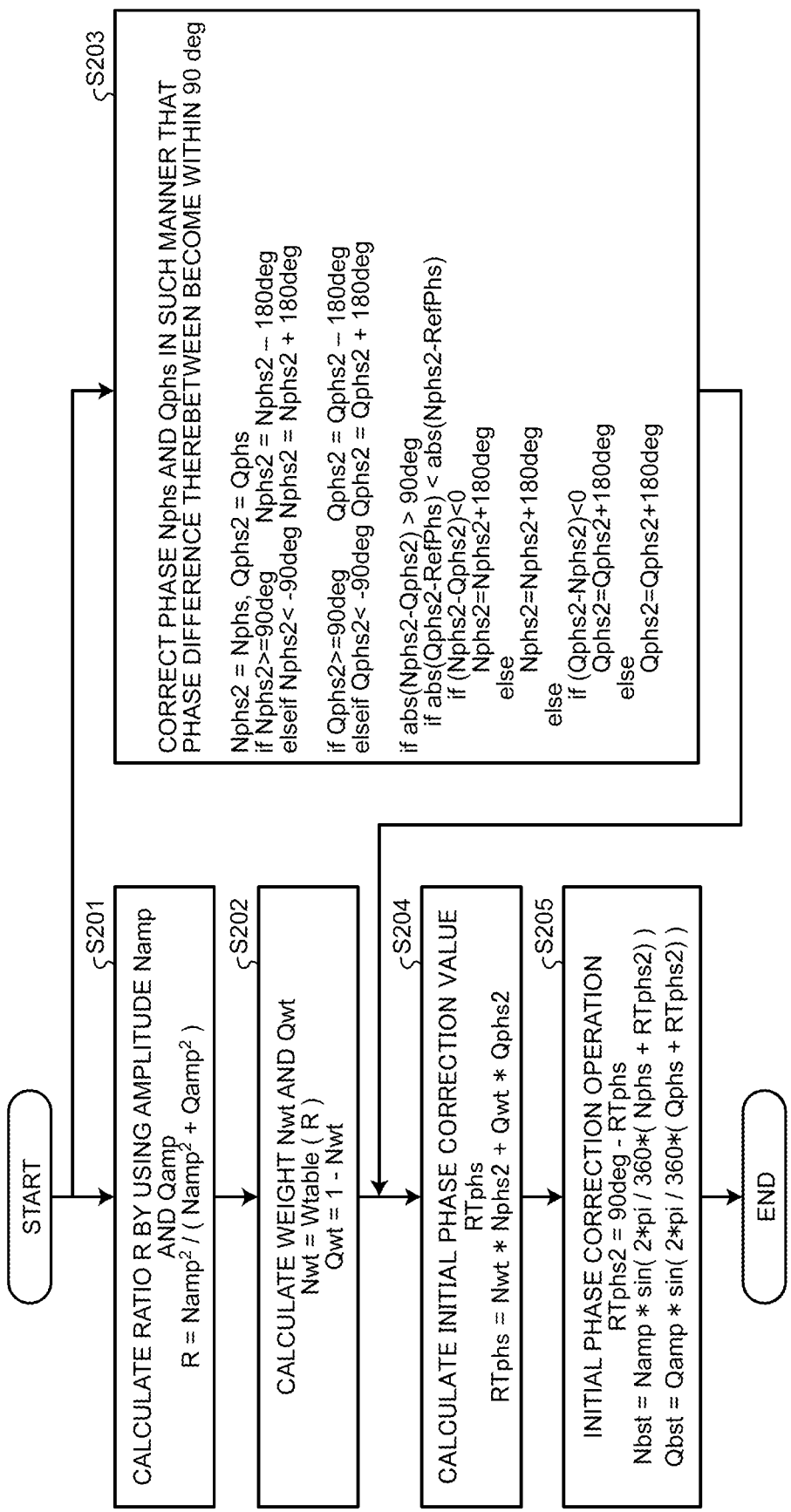
FIG. 12 is a flowchart illustrating an example of an operation related to an initial phase correction operation executed in a magnetic disk device of a second embodiment.

FIG. 12 is a flowchart illustrating an example of an operation related to the initial phase correction operation executed in a magnetic disk device 1 of a second embodiment. A series of operations illustrated in FIG. 12 can be executed in the processing of Step S102 illustrated in FIG. 11.

First, a controller 30 calculates a ratio R by using the amplitude Namp of the N burst and the amplitude Qamp of the Q burst (S201). Specifically, the controller 30 calculates the ratio R by using the following expression (1).

$$R = Namp^2/(Namp^2 + Qamp^2) \quad (1)$$

Subsequently, on the basis of the following expressions (2) and (3), the controller 30 calculates weight Nwt by which the phase Nphs of the N burst is multiplied and weight Qwt by which the phase Qphs of the Q burst is multiplied (S202).

$$Nwt = Wtable(R) \quad (2)$$

$$Qwt = 1 - Nwt \quad (3)$$

Note that Wtable is a table that defines a relationship between the weight Nwt and the ratio R and that is prepared in advance. The table Wtable is optimized for each magnetic disk device, each magnetic head, and each radial position, for example.

The controller 30 corrects the phases Nphs and Qphs by the following procedure in such a manner that a phase difference between them is within 90 degrees (S203). Nphs2 and Qphs2 are calculation results corrected in such a manner that the phase difference between them is within 90 degrees.

```
Nphs2 = Nphs, and Qphs2 = Qphs
if Nphs2 >= 90deg Nphs2 phs2 - 180deg
elseif Nphs2 < -90deg Nphs2 = Nphs2 + 180deg
if Qphs2 >= 90deg Qphs2 = Qphs2 - 180deg
elseif Qphs2 < -90deg Qphs2 = Qphs2 + 180deg
if abs(Nphs2 - Qphs2) > 90deg
    if abs(Qphs2 - RefPhs) < abs(Nphs2 - RefPhs)
        if (Nphs2 - Qphs2) < 0
            Nphs2 = Nphs2 + 180deg
        else
            Nphs2 = Nphs2 - 180deg
    else
        if (Qphs2 - Nphs2) < 0
            Qphs2 = Qphs2 + 180deg
        else
            Qphs2 = Qphs2 - 180deg
```

Note that RefPhs is an expected value of the initial phase correction value.

After the processing of Step S202 and S203, the controller 30 calculates an initial phase correction value RTphs on the basis of the following expression (4) (S204).

$$RTphs = Nwt*Nphs2 + Qwt*Qphs2 \quad (4)$$

Then, the controller 30 performs the initial phase correction operation on the basis of the following expressions (5), (6), and (7) and acquires N-burst data Nbst after the initial phase correction operation and Q-burst data Qbst after the initial phase correction operation (S205). An expression (5) is conversion processing of the initial phase correction value, which is performed in a case where calculation by sine functions expressed in expressions (6) and (7) are performed. Hereinafter, RTphs2 may also be referred to as an initial phase correction value.

$$RTphs2 = 90deg - RTphs \quad (5)$$

$$Nbst = Namp*sin(2*pi/360*(Nphs+RTphs2)) \quad (6)$$

$$Qbst = Qamp*sin(2*pi/360*(Qphs+RTphs2)) \quad (7)$$

The controller 30 calculates a demodulation position dpos on the basis of the calculation results of Nbst and Qbst after the initial phase correction operation, which are obtained by the initial phase correction operation.

The initial phase correction value RTphs obtained by the processing of Step S204 exhibits behavior similar to that of the phases Nphs and Qphs with respect to a deviation amount of a burst demodulation window. Note that the initial phase correction value RTphs calculated by the expression (4) and RTphs2 calculated by the expression (5) are calculated to be values in a range from 0 degree to 180 degrees, so that a folding operation is unnecessary. Hereinafter, the initial phase correction value RTphs calculated by the expression (4) will be described as a phase used for determining whether there is the timing deviation.

Figure 13:
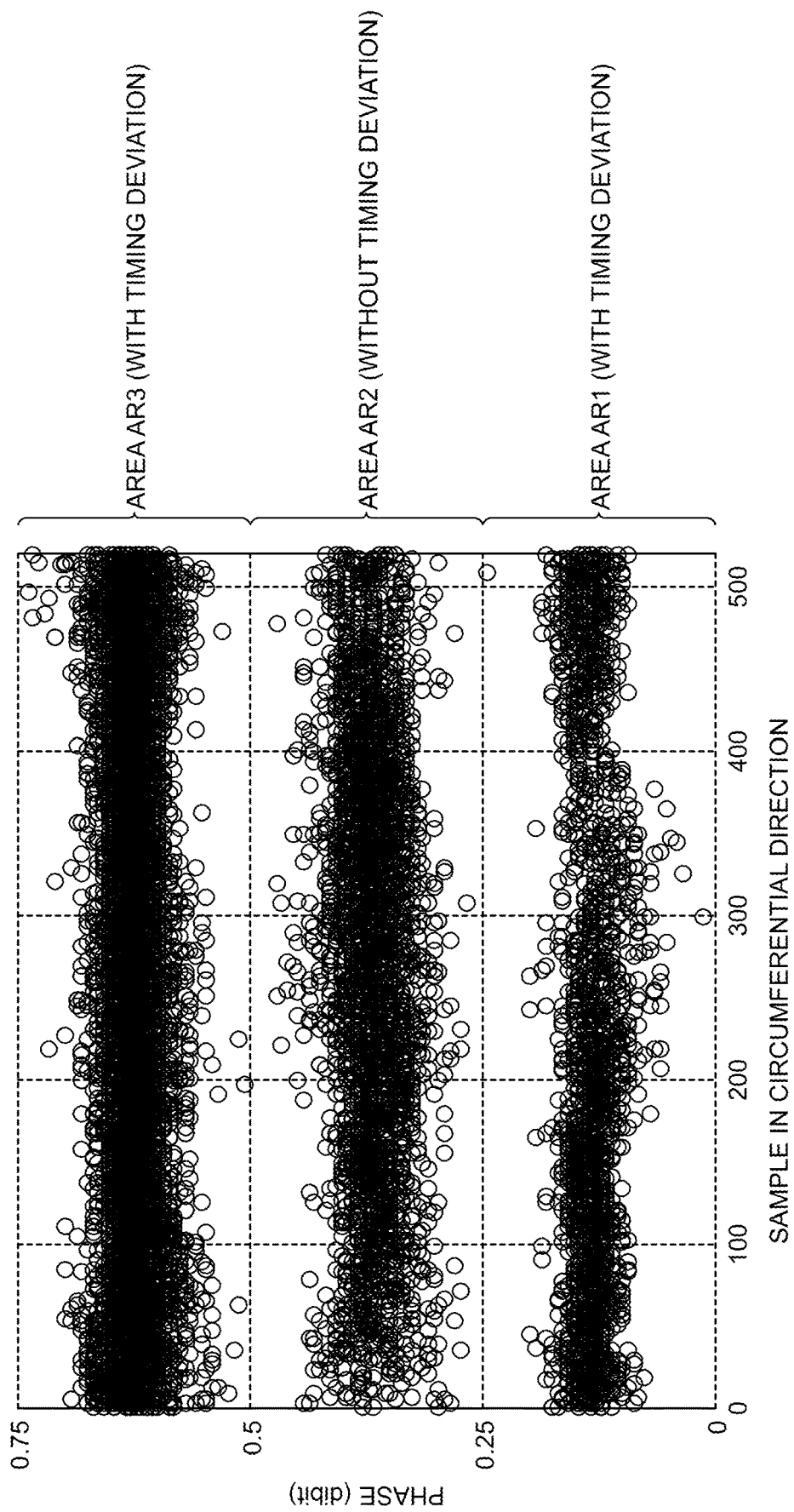
FIG. 13 is a view illustrating an example of a distribution of initial phase correction values obtained by a controller of the second embodiment.

FIG. 13 is a view illustrating an example of a distribution of the initial phase correction value RTphs obtained by the controller 30 of the second embodiment. In FIG. 13, the horizontal axis represents each servo sector in a predetermined track, and the vertical axis represents a phase expressed by dibit. A left end of the horizontal axis is, for example, a start servo sector of one revolution, and a right end of the horizontal axis is, for example, a last servo sector of the one revolution.

It can be read from FIG. 13 that the initial phase correction value RTphs acquired in the initial phase correction operation is sparsely distributed in both of a vicinity of a first threshold (such as 0.25 dibit) and a vicinity of a second threshold (such as 0.75 dibit). This is due to a reason described below.

The magnetic disk device 1 is configured in such a manner that timing deviation is discretely generated in increments of 1 dibit. Thus, the phases Nphs and Qphs after the folding operation should inherently take discrete values according to timing deviation amount. However, when the read head 22r passes through the vicinity of the boundary where the polarity of the burst pattern changes, the amplitude decreases, and errors in the phases Nphs and Qphs increase. Thus, actual phases Nphs and Qphs after the folding operation vary widely. From this, in a case where it is attempted to determine whether the actual phases Nphs and Qphs are included in a specific area AR (such as an area AR) on the basis of comparison between the actual phases Nphs and Qphs and the thresholds (the first threshold and the second threshold), a determination result may include an error.

In the initial phase correction value RTphs acquired in the process of the initial phase correction operation, errors in the phases of when the read head 22r passes through the vicinity of the boundary where the polarity of the burst pattern changes are suppressed. The reason why the errors can be suppressed is that weight of a burst having small amplitude becomes close to 0 in the calculation expression in the expression (4), and a phase having a large variation is not used. Thus, the distribution of the initial phase correction value RTphs is more discretized than the distributions of the phases Nphs and Qphs. Thus, the distribution of the initial phase correction value RTphs becomes sparse near the first threshold and the second threshold corresponding to the boundary between the areas AR. From this, by determining whether the initial phase correction value RTphs is included in a specific area AR (such as the area AR) on the basis of the comparison between the initial phase correction value RTphs and the thresholds (the first threshold and the second threshold), it is possible to suppress an error that can be included in a determination result. That is, by using the initial phase correction value RTphs in the demodulation position correction operation, accuracy of the determination of presence or absence of timing deviation is improved, and an incorrect demodulation position calculation result can be correctly corrected, whereby positioning accuracy is further improved.

Figure 14:
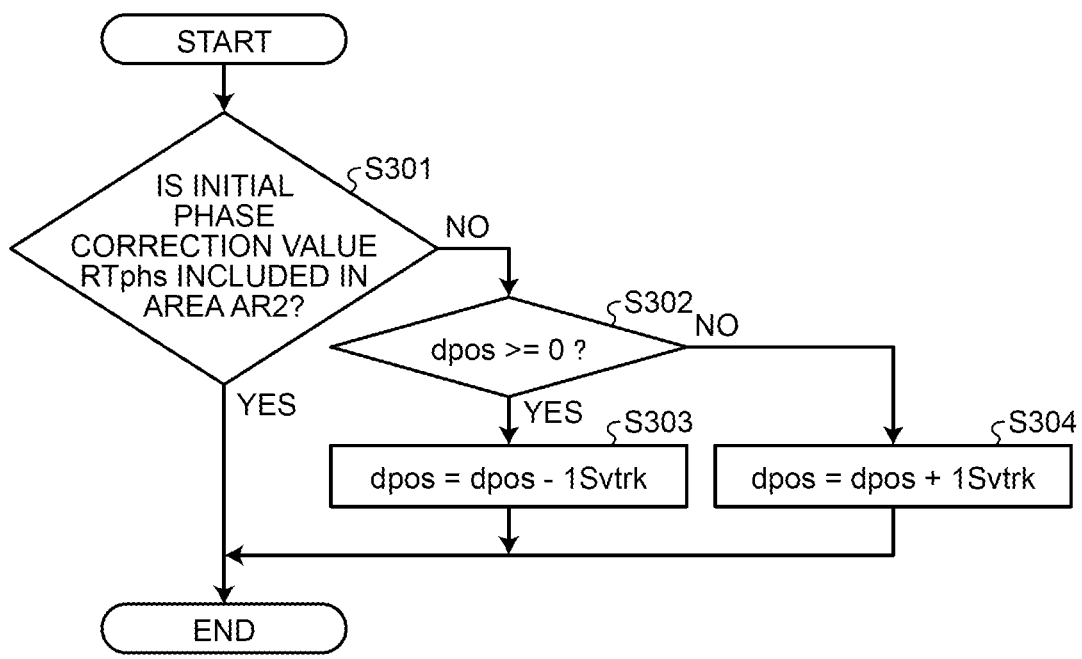
FIG. 14 is a flowchart illustrating an example of a demodulation position correction operation of the second embodiment.

FIG. 14 is a flowchart illustrating an example of the demodulation position correction operation of the second embodiment.

The controller 30 determines whether the initial phase correction value RTphs is included in an area AR2 (S301).

Specifically, the controller 30 determines whether the initial phase correction value RTphs is included in the area AR2 by comparing the initial phase correction value RTphs with the first threshold corresponding to a boundary between an area AR1 and the area AR2 and the second threshold corresponding to a boundary between the area AR2 and an area AR3. In the example illustrated in FIG. 13, the first threshold is 0.25 dibit, and the second threshold is 0.5 dibit. Note that example of the first threshold and the second threshold is not limited to the above. In a case where the initial phase correction value RTphs is larger than the first threshold and the initial phase correction value RTphs is smaller than the second threshold, the controller 30 determines that the initial phase correction value RTphs is included in the area AR2. In a case where the initial phase correction value RTphs is smaller than the first threshold or the initial phase correction value RTphs is larger than the second threshold, the controller 30 determines that the initial phase correction value RTphs is not included in the area AR2. In a case where the initial phase correction value RTphs is equal to the first threshold or the initial phase correction value RTphs is equal to the second threshold, the controller 30 may determine that the initial phase correction value RTphs is included in the area AR2 or the initial phase correction value RTphs is not included in the area AR2.

In a case where the initial phase correction value RTphs is included in the area AR2 (S301: Yes), it is estimated that there is no timing deviation. Thus, the controller 30 ends the calculation of the demodulation position. That is, the controller 30 uses the demodulation position dpos, which is obtained by the processing of Step S102 and to which the initial phase correction operation is applied, as it is for the positioning control.

In a case where the initial phase correction value RTphs is not included in the area AR2 (S301: No), it is estimated that there is the timing deviation. In such a case, the controller 30 corrects the demodulation position dpos on the basis of a sign of the demodulation position dpos.

More specifically, the controller 30 determines whether the demodulation position dpos is 0 or more (S302). In a case where the demodulation position dpos is 0 or more (S302: Yes), the controller 30 performs correction by subtracting 1 Svtrk from the demodulation position dpos (S303). In a case where the demodulation position dpos is less than 0 (S302: No), the controller 30 performs correction by adding 1 Svtrk to the demodulation position dpos (S304).

Note that the processing of a case where the demodulation position dpos is equal to 0 is not limited to the example described above. In a case where the demodulation position dpos is equal to 0, the controller 30 may execute the processing of Step S302.

After the processing of Step S303 or Step S304, the controller 30 ends the calculation of the demodulation position. That is, the controller 30 uses the demodulation position dpos corrected by the processing of Step S303 or Step S304 for the positioning control.

As described above, the controller 30 determines the timing deviation with respect to the phase Nphs of the N burst and the phase Qphs of the Q burst by using the initial phase correction value RTphs that can be calculated by the weighted addition based on the ratio R between the value obtained by squaring of the amplitude Namp of the N burst and the value obtained by squaring of the amplitude Qamp of the Q burst, and corrects the demodulation position dpos in a case a where the timing is deviated.

Thus, since an incorrect demodulation calculation result due to the timing deviation can be correctly corrected, the positioning accuracy is further improved.

Note that the technology of the first embodiment or the second embodiment is applied to all the servo tracks 41 arranged on the magnetic disk 11. The technology of the first embodiment or the second embodiment may be applied to a part of the servo tracks 41 among all the servo tracks 41 arranged on the magnetic disk 11. For example, a recording surface of the magnetic disk 11 is divided into radial areas in plural radial directions, and the technology of the first embodiment or the second embodiment may be applied to at least one of the radial areas. In addition, a dividing direction is not limited to the radial directions. That is, the technology of the first embodiment or the second embodiment may be applied to at least a part of the areas on the recording surface of the magnetic disk 11 and may not be applied to the other areas.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk on which at least two or more first servo sectors, each recording servo data, are arranged at intervals in a circumference direction, the servo data including a preamble and a burst pattern, a recording frequency of the preamble being 1/K (K is a positive integer) of a first frequency, a recording frequency of the burst pattern being 1/L (L is a positive integer) of the first frequency, the recording frequency of the preamble being different from an even multiple of the recording frequency of the burst pattern;
a magnetic head that executes writing/reading of data on the magnetic disk in a write/read direction along the circumferential direction; and
a controller that
 determines a demodulation period of the burst pattern while the magnetic head passes through one of the at least two or more first servo sectors,
 performs sampling on the burst pattern at the first frequency in the demodulation period,
 demodulates a burst waveform obtained by the sampling and acquires a first phase of the burst waveform and first position information of the magnetic head,
 corrects the first position information on the basis of the first phase, and
 executes positioning control of the magnetic head on the basis of second position information being post-correction first position information.

2. The magnetic disk device according to claim 1, wherein the recording frequency of the burst pattern is ⅔ times the recording frequency of the preamble.

3. The magnetic disk device according to claim 1, wherein the controller
 determines, on the basis of the first phase, whether there is a timing deviation of the demodulation period,
 acquires the second position information different from the first position information in response to determining that there is the timing deviation, and
 acquires the first position information as the second position information in response to determining that there is no timing deviation.

4. The magnetic disk device according to claim 3, wherein, in response to determining that there is the timing deviation, the controller
 acquires the second position information by subtracting an amount corresponding to a servo track pitch from the first position information when a sign of the first position information is positive, and
 acquires the second position information by adding the amount corresponding to the servo track pitch to the first position information when the sign of the first position information is negative.

5. The magnetic disk device according to claim 1, wherein the burst pattern includes an N burst and a Q burst, and the controller
 acquires an N burst sampled waveform and a Q burst sampled waveform by performing sampling on the N burst and the Q burst at the first frequency, the N burst sampled waveform being a burst waveform obtained by the sampling of the N burst, the Q burst sampled waveform being a burst waveform obtained by the sampling of the Q burst,
 acquires first amplitude and a second phase of the N burst sampled waveform and acquires second amplitude and a third phase of the Q burst sampled waveform, by demodulating the N burst sampled waveform and the Q burst sampled waveform, and
 acquires the first phase by performing weighted addition on the second phase and the third phase, the weighted addition being performed on the basis of a ratio between a value obtained by squaring of the first amplitude and a value obtained by squaring of the second amplitude.

6. The magnetic disk device according to claim 1, wherein
a servo mark is recorded in front of the burst pattern in the write/read direction in each of the first servo sectors,
a number of the first servo sectors is at least three or more, the first servo sectors including at least two or more second servo sectors and at least one or more third servo sectors, each of the third servo sectors being arranged between two of the at least two or more second servo sectors, and
the controller determines, on the basis of timing of detection of the servo mark in one of the at least two or more second servo sectors, a demodulation period of the burst pattern in the third servo sector arranged after the one of the at least two or more second servo sectors in the write/read direction.

7. The magnetic disk device according to claim 2, wherein
a servo mark is recorded in front of the burst pattern in the write/read direction in each of the first servo sectors,
a number of the first servo sectors is at least three or more, the first servo sectors including at least two or more second servo sectors and at least one or more third servo sectors, each of the third servo sectors being arranged between two of the at least two or more second servo sectors, and
the controller determines, on the basis of timing of detection of the servo mark in one of the at least two or more second servo sectors, a demodulation period of the burst pattern in the third servo sector arranged after the one of the at least two or more second servo sectors in the write/read direction.

8. The magnetic disk device according to claim 3, wherein
a servo mark is recorded in front of the burst pattern in the write/read direction in each of the first servo sectors,
a number of the first servo sectors is at least three or more, the first servo sectors including at least two or more second servo sectors and at least one or more third servo sectors, each of the third servo sectors being arranged between two of the at least two or more second servo sectors, and
the controller determines, on the basis of timing of detection of the servo mark in one of the at least two or more second servo sectors, a demodulation period of the burst pattern in the third servo sector arranged after the one of the at least two or more second servo sectors in the write/read direction.

9. The magnetic disk device according to claim 4, wherein
a servo mark is recorded in front of the burst pattern in the write/read direction in each of the first servo sectors,
a number of the first servo sectors is at least three or more, the first servo sectors including at least two or more second servo sectors and at least one or more third servo sectors, each of the third servo sectors being arranged between two of the at least two or more second servo sectors, and
the controller determines, on the basis of timing of detection of the servo mark in one of the at least two or more second servo sectors, a demodulation period of the burst pattern in the third servo sector arranged after the one of the at least two or more second servo sectors in the write/read direction.

10. The magnetic disk device according to claim 6, wherein the magnetic disk includes a data area allowing user data to be written, the data area being arranged immediately after an area in the write/read direction where the burst pattern of each of the third servo sectors is recorded.

11. A method of controlling a magnetic disk device, the magnetic disk device including a magnetic disk and a magnetic head, the magnetic disk being a magnetic disk on which at least two or more first servo sectors each recording servo data are arranged at intervals in a circumferential direction, the servo data including a preamble and a burst pattern being recorded in each of the first servo sectors, a recording frequency of the preamble being 1/K (K is a positive integer) of a first frequency, a recording frequency of the burst pattern being 1/L (L is a positive integer) of the first frequency, the recording frequency of the preamble being different from an even multiple of the recording frequency of the burst pattern, the method comprising:

determining a demodulation period of the burst pattern while the magnetic head passes through one of the at least two or more first servo sectors;

performing sampling on the burst pattern at the first frequency in the demodulation period;

demodulating a burst waveform obtained by the sampling and acquiring a first phase of the burst waveform and first position information of the magnetic head;

correcting the first position information on the basis of the first phase; and executing positioning control of the magnetic head on the basis of second position information being post-correction first position information.

12. The method according to claim 11, wherein the recording frequency of the burst pattern is ⅔ times the recording frequency of the preamble.

13. The method according to claim 11, further comprising:

determining, on the basis of the first phase, whether there is a timing deviation of the demodulation period;

acquiring the second position information different from the first position information in response to determining that there is the timing deviation; and acquiring the first position information as the second position information in response to determining that there is no timing deviation.

14. The method according to claim 13, further comprising, in response to determining that there is the timing deviation, acquiring the second position information by subtracting an amount corresponding to a servo track pitch from the first position information when a sign of the first position information is positive, and acquiring the second position information by adding the amount corresponding to the servo track pitch to the first position information when the sign of the first position information is negative.

15. The method according to claim 11, wherein the burst pattern includes an N burst and a Q burst, the method further comprising:

acquiring an N burst sampled waveform and a Q burst sampled waveform by performing sampling on the N burst and the Q burst at the first frequency, the N burst sampled waveform being a burst waveform obtained by the sampling of the N burst, the Q burst sampled waveform being a burst waveform obtained by the sampling of the Q burst;

acquiring first amplitude and a second phase of the N burst sampled waveform and acquiring second amplitude and a third phase of the Q burst sampled waveform, by demodulating the N burst sampled waveform and the Q burst sampled waveform; and acquiring the first phase by performing weighted addition on the second phase and the third phase, the weighted addition being performed on the basis of a ratio between a value obtained by squaring of the first amplitude and a value obtained by squaring of the second amplitude.

16. The method according to claim 11, wherein a servo mark is recorded in front of the burst pattern in the write/read direction in each of the first servo sectors, a number of the first servo sectors is at least three or more, the first servo sectors including at least two or more second servo sectors and at least one or more third servo sectors, each of the third servo sectors being arranged between two of the at least two or more second servo sectors, and the method further comprising determining, on the basis of timing of detection of the servo mark in one of the at least two or more second servo sectors, a demodulation period of the burst pattern in the third servo sector arranged after the one of the at least two or more second servo sectors in the write/read direction.

17. The method according to claim 12, wherein a servo mark is recorded in front of the burst pattern in the write/read direction in each of the first servo sectors, a number of the first servo sectors is at least three or more, the first servo sectors including at least two or more second servo sectors and at least one or more third servo sectors, each of the third servo sectors being arranged between two of the at least two or more second servo sectors, and the method further comprising determining, on the basis of timing of detection of the servo mark in one of the at least two or more second servo sectors, a demodulation period of the burst pattern in the third servo sector arranged after the one of the at least two or more second servo sectors in the write/read direction.

18. The method according to claim 13, wherein a servo mark is recorded in front of the burst pattern in the write/read direction in each of the first servo sectors, a number of the first servo sectors is at least three or more, the first servo sectors including at least two or more second servo sectors and at least one or more third servo sectors, each of the third servo sectors being arranged between two of the at least two or more second servo sectors, and the method further comprising determining, on the basis of timing of detection of the servo mark in one of the at least two or more second servo sectors, a demodulation period of the burst pattern in the third servo sector arranged after the one of the at least two or more second servo sectors in the write/read direction.

19. The method according to claim 14, wherein a servo mark is recorded in front of the burst pattern in the write/read direction in each of the first servo sectors, a number of the first servo sectors is at least three or more, the first servo sectors including at least two or more second servo sectors and at least one or more third servo sectors, each of the third servo sectors being arranged between two of the at least two or more second servo sectors, and the method further comprising determining, on the basis of timing of detection of the servo mark in one of the at least two or more second servo sectors, a demodulation period of the burst pattern in the third servo sector arranged after the one of the at least two or more second servo sectors in the write/read direction.

20. The method according to claim 16, wherein the magnetic disk includes a data area allowing user data to be written, the data area being arranged immediately after an area in the write/read direction where the burst pattern of each of the third servo sectors is recorded.

* * * * *